(12) United States Patent
Rico Alvarino et al.

(10) Patent No.: US 10,638,485 B2
(45) Date of Patent: Apr. 28, 2020

(54) TECHNIQUES AND APPARATUSES FOR CHANNEL INTERFERENCE REDUCTION

(71) Applicant: QUALCOMM Incorporated, San Diego, CA (US)

(72) Inventors: Alberto Rico Alvarino, San Diego, CA (US); Kapil Bhattad, Bangalore (IN); Xiao feng Wang, San Diego, CA (US); Juan Montojo, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 15/661,860

(22) Filed: Jul. 27, 2017

(65) Prior Publication Data

US 2018/0220426 A1    Aug. 2, 2018

Related U.S. Application Data

(60) Provisional application No. 62/459,409, filed on Feb. 15, 2017, provisional application No. 62/458,353, filed on Feb. 13, 2017.

(30) Foreign Application Priority Data

Jan. 27, 2017    (IN) .............................. 201741003102

(51) Int. Cl.
*H04W 72/04* (2009.01)
*H04L 1/08* (2006.01)
*H04J 11/00* (2006.01)

(52) U.S. Cl.
CPC ....... *H04W 72/0466* (2013.01); *H04J 11/005* (2013.01); *H04L 1/08* (2013.01); *H04W 72/042* (2013.01)

(58) Field of Classification Search
CPC ........... H04W 72/0466; H04W 72/044; H04W 72/04; H04W 72/00; H04W 72/042;
(Continued)

(56) References Cited

U.S. PATENT DOCUMENTS 8,059,751 B2 * 11/2011 Zielinski ............. H04L 27/2634
375/261
8,279,909 B2    10/2012 Noh et al.
(Continued)

FOREIGN PATENT DOCUMENTS

WO        2015042984 A1    4/2015
WO    WO-2016167707 A1    10/2016

OTHER PUBLICATIONS

PBCH repetition for MTC 7.2.1.6 (Year: 2015).*
(Continued)

*Primary Examiner* — Jeffrey M Rutkowski
*Assistant Examiner* — Luna Weissberger
(74) *Attorney, Agent, or Firm* — Harrity & Harrity, LLP

(57) ABSTRACT

A base station (BS) may transmit, and a user equipment (UE) may receive, a physical broadcast channel, such as a narrowband physical broadcast channel (NB-PBCH). In an interference-limited scenario with synchronous cells in a network, repetitions of a symbol being transmitted for a first physical broadcast channel of a first cell may collide with repetitions of a symbol being transmitted for a second physical broadcast channel of a second cell. This may result in the UE being unable to recover symbols of a physical broadcast channel. In some aspects, the BS may transmit, and the UE may receive, a physical broadcast channel including bits processed using a first processing stage, such as using first scrambling sequences, and a second processing stage, such as using second scrambling sequences, to com-
(Continued)

pensate for the interference, thereby ensuring that the UE can recover the symbols of the physical broadcast channel.

30 Claims, 19 Drawing Sheets

(58) Field of Classification Search
CPC ..... H04W 72/0406; H04L 1/08; H04J 11/005; H04J 11/0023
USPC .......................................................... 370/335
See application file for complete search history.

(56) References Cited

U.S. PATENT DOCUMENTS

| | | | | |
|---|---|---|---|---|
| 2014/0355531 | A1* | 12/2014 | Han | ............... H04L 27/2613 370/329 |
| 2015/0078348 | A1* | 3/2015 | Han | ............... H04W 4/70 370/336 |
| 2016/0095095 | A1* | 3/2016 | Lorca Hernando | ............... H04W 72/042 370/329 |
| 2016/0212724 | A1 | 7/2016 | Seo et al. | |
| 2016/0301515 | A1* | 10/2016 | Ouchi | ............... H04L 5/0057 |
| 2017/0093530 | A1 | 3/2017 | Kudekar et al. | |
| 2017/0099658 | A1 | 4/2017 | Shattil | |

OTHER PUBLICATIONS

Generation Partnership Project; Technical Specification Group Radio Access Network; Evolved Universal Terrestrial Radio Access (E-UTRA); Physical channels and modulation 3GPP TS 36.211 V14.1.0, (Year: 2016).*

"3rd Generation Partnership Project; Technical Specification Group Radio Access Network; Evolved Universal Terrestrial Radio Access (E-UTRA); Physical channels and Modulation (Release 14)", 3GPP Standard; 3GPP TS 36.211, 3rd Generation Partnership Project (3GPP), Mobile Competence Centre; 650, Route Des Lucioles; F-06921 Sophia-Antipolis Cedex; France, vol. RAN WG1, No. V14.1.0, Jan. 2, 2017, XP051230334, pp. 69-139, [retrieved on Jan. 2, 2017].

International Search Report and Written Opinion—PCT/US2018/012616—ISA/EPO—dated Apr. 12, 2018.

* cited by examiner

TECHNIQUES AND APPARATUSES FOR CHANNEL INTERFERENCE REDUCTION

CROSS-REFERENCE TO RELATED APPLICATIONS UNDER 35 U.S.C. § 119

This application claims priority to India Provisional Patent Application No. 201741003102 filed on Jan. 27, 2017 entitled "TECHNIQUES AND APPARATUSES FOR NARROWBAND PHYSICAL BROADCAST CHANNEL (NB-PBCH) INTERFERENCE REDUCTION," which is incorporated by reference herein.

This application claims priority to U.S. Provisional Patent Application No. 62/458,353 filed on Feb. 13, 2017 entitled "TECHNIQUES AND APPARATUSES FOR NARROWBAND PHYSICAL BROADCAST CHANNEL (NB-PBCH) INTERFERENCE REDUCTION," which is incorporated by reference herein.

This application claims priority to U.S. Provisional Patent Application No. 62/459,409 filed on Feb. 15, 2017 entitled "TECHNIQUES AND APPARATUSES FOR NARROWBAND PHYSICAL BROADCAST CHANNEL (NB-PBCH) INTERFERENCE REDUCTION," which is incorporated by reference herein.

BACKGROUND

Field

Aspects of the present disclosure generally relate to wireless communication, and more particularly to techniques and apparatuses for channel interference reduction.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

A BS may transmit a channel to provide information to a UE. For example, the BS may transmit a narrowband physical broadcast channel (NB-PBCH) to provide service to an Internet of Things (IoT) type of UE. The physical broadcast channel may be associated with a transmission time interval (TTI), such as approximately 640 milliseconds. The BS may repeat symbols across a plurality of consecutive transmissions of a subframe of the physical broadcast channel, and may scramble the consecutive transmissions of the subframe using the same scrambling sequence and based at least in part on a cell identifier. However, in an interference-limited scenario for synchronous cells, repetitions of a first symbol of a first cell may interfere with repetitions of a second symbol of a second cell. A UE that is to receive the first symbol via a first physical broadcast channel of a first cell may be unable to perform averaging to overcome the interference of a second physical broadcast channel transmitted by a second cell. Furthermore, since the repetitions of a first symbol of the first cell and repetitions of the second symbol of a second cell remain constant over each set of repetitions, the UE may not be able to reduce the interference through symbol combining techniques.

SUMMARY

Aspects described herein provide a mechanism by which a BS may transmit, and a UE may receive, a channel in an interference-limited scenario with synchronous cells. It had been considered to have the BS perform scrambling at a bit level for repetitions of a symbol of the first cell to permit the UE to overcome the interference of the second cell. Performing additional scrambling of channel transmissions may, in some cases, prevent the UE from performing symbol level combining. For example, when the BS applies a different scrambling sequence to each bit, the UE may be prevented from performing symbol level combining. In this case, the UE may perform bit level de-scrambling, which may use additional computing resources, such as an excessively large log-likelihood ratio (LLR) buffer, relative to performing symbol level combining. Thus, it may be beneficial for the BS to perform multiple stages of processing such that the UE can reverse the multiple stages of processing without using additional computing resources, such as an excessively large LLR buffer.

Aspects, described herein, may enable transmission and reception of a channel without performing scrambling by a BS that prevents symbol level combining by a UE. The BS may apply, in a first processing stage, scrambling to blocks of the channel based at least in part on a cell identity of the BS. The BS may, in some aspects, apply, in a second processing stage, scrambling or phase rotation to bits of each block based at least in part on the cell identity of the BS. This may ensure reduced interference for a channel relative to the channel being transmitted without multiple stages of scrambling.

The BS may transmit information, such as a cell identifier, identifying the cell identity, and may transmit blocks of the channel including the scrambled bits. Similarly, the UE may receive the cell identifier, and may receive the channel. The UE may reverse the second stage of processing based at least in part on the second stage of processing including the same scrambling sequence applied to bits of multiple blocks, and based at least in part on determining a boundary between each block. The UE may reverse the first stage of processing using a hypothesis testing procedure. In this way, the UE can determine the bits included in the channel using a reduced utilization of processing resources relative to each bit being associated with a different scrambling sequence. Moreover, by compensating for interference with another channel using multiple stages of processing, the UE can determine the bits included in the channel, thereby improving network performance.

In an aspect of the disclosure, methods, devices, apparatus, and computer program products are provided.

In some aspects, the method may include transmitting, by a base station, a cell identifier for a cell. In some aspects, the method may include transmitting, by the base station, a physical broadcast channel. The physical broadcast channel may include a plurality of blocks. Each block, of the plurality of blocks, may include repeating subsets of bits. Each block, of the plurality of blocks, may be processed using a first processing stage. Each repetition of the repeating subsets of bits, for each block, may be processed using a second processing stage such that a particular repetition of the repeating subset of bits of a first block and a corresponding particular repetition of the repeating subset of bits of a second block are processed using a common processing scheme. The first processing stage and the second processing stage may be each initialized based at least in part on the cell identifier.

In some aspects, the device may include a memory and one or more processors coupled to the memory. The memory and the one or more processors may be configured to transmit a cell identifier for a cell. The memory and the one or more processors may be configured to transmit a physical broadcast channel. The physical broadcast channel may include a plurality of blocks. Each block, of the plurality of blocks, may include repeating subsets of bits. Each block, of the plurality of blocks, may be processed using a first processing stage. Each repetition of the repeating subsets of bits, for each block, may be processed using a second processing stage such that a particular repetition of the repeating subset of bits of a first block and a corresponding particular repetition of the repeating subset of bits of a second block are processed using a common processing scheme. The first processing stage and the second processing stage may be each initialized based at least in part on the cell identifier.

In some aspects, the apparatus may include means for transmitting a cell identifier for a cell. The apparatus may include means for transmitting a physical broadcast channel. The physical broadcast channel may include a plurality of blocks. Each block, of the plurality of blocks, may include repeating subsets of bits. Each block, of the plurality of blocks, may be processed using a first processing stage. Each repetition of the repeating subsets of bits, for each block, may be processed using a second processing stage such that a particular repetition of the repeating subset of bits of a first block and a corresponding particular repetition of the repeating subset of bits of a second block are processed using a common processing scheme. The first processing stage and the second processing stage may be each initialized based at least in part on the cell identifier.

In some aspects, the computer program product may include a non-transitory computer-readable medium storing one or more instructions for wireless communication that, when executed by one or more processors of a device, cause the one or more processors to transmit a cell identifier for a cell. The one or more instructions may cause the one or more processors to transmit a physical broadcast channel. The physical broadcast channel may include a plurality of blocks. Each block, of the plurality of blocks, may include repeating subsets of bits. Each block, of the plurality of blocks, may be processed using a first processing stage. Each repetition of the repeating subsets of bits, for each block, may be processed using a second processing stage such that a particular repetition of the repeating subset of bits of a first block and a corresponding particular repetition of the repeating subset of bits of a second block are processed using a common processing scheme. The first processing stage and the second processing stage may be each initialized based at least in part on the cell identifier.

In some aspects, the method may include transmitting, by a base station, a cell identifier for a cell. In some aspects, the method may include transmitting, by the base station, a physical broadcast channel. The physical broadcast channel may include a plurality of blocks. Each block, of the plurality of blocks, may include repeating subsets of symbols. Each repetition of the repeating subsets of symbols, for each block, may be processed using a processing stage such that a particular repetition of the repeating subset of symbols of a first block and a corresponding particular repetition of the repeating subset of symbols of a second block are processed using a common processing scheme. The processing stage may be initialized based at least in part on the cell identifier or the frame number.

In some aspects, the method may include receiving, by a user equipment, a cell identifier for a cell. In some aspects, the method may include receiving, by the user equipment, a physical broadcast channel. The physical broadcast channel may include a plurality of blocks. Each block, of the plurality of blocks, may include repeating subsets of bits. Each block, of the plurality of blocks, may be processed using a first processing stage. Each repetition of the repeating subsets of bits, for each block, may be processed using a second processing stage such that a particular repetition of the repeating subset of bits of a first block and a corresponding particular repetition of the repeating subset of bits of a second block are processed using a common processing scheme. The first processing stage and the second processing stage may be each initialized based at least in part on the cell identifier.

In some aspects, the device may include a memory and one or more processors coupled to the memory. The memory and the one or more processors may be configured to receive a cell identifier for a cell. The memory and the one or more processors may be configured to receive a physical broadcast channel. The physical broadcast channel may include a plurality of blocks. Each block, of the plurality of blocks, may include repeating subsets of bits. Each block, of the plurality of blocks, may be processed using a first processing stage. Each repetition of the repeating subsets of bits, for each block, may be processed using a second processing stage such that a particular repetition of the repeating subset of bits of a first block and a corresponding particular repetition of the repeating subset of bits of a second block are processed using a common processing scheme. The first processing stage and the second processing stage may be each initialized based at least in part on the cell identifier.

In some aspects, the apparatus may include means for receiving a cell identifier for a cell. The apparatus may include means for receiving a physical broadcast channel. The physical broadcast channel may include a plurality of blocks. Each block, of the plurality of blocks, may include repeating subsets of bits. Each block, of the plurality of blocks, may be processed using a first processing stage. Each repetition of the repeating subsets of bits, for each block, may be processed using a second processing stage such that a particular repetition of the repeating subset of bits of a first block and a corresponding particular repetition of the repeating subset of bits of a second block are processed using a common processing scheme. The first processing stage and the second processing stage may be each initialized based at least in part on the cell identifier.

In some aspects, the computer program product may include a non-transitory computer-readable medium storing one or more instructions for wireless communication that, when executed by one or more processors of a device, cause the one or more processors to receive a cell identifier for a cell. The one or more instructions may cause the one or more processors to receive a physical broadcast channel. The physical broadcast channel may include a plurality of blocks. Each block, of the plurality of blocks, may include repeating subsets of bits. Each block, of the plurality of blocks, may be processed using a first processing stage. Each repetition of the repeating subsets of bits, for each block, may be processed using a second processing stage such that a particular repetition of the repeating subset of bits of a first block and a corresponding particular repetition of the repeating subset of bits of a second block are processed using a common processing scheme. The first processing stage and the second processing stage may be each initialized based at least in part on the cell identifier.

In some aspects, the method may include receiving, by a user equipment, a cell identifier for a cell. In some aspects, the method may include receiving, by the user equipment, a physical broadcast channel. The physical broadcast channel may include a plurality of blocks. Each block, of the plurality of blocks, may include repeating subsets of symbols. Each repetition of the repeating subsets of symbols, for each block, may be processed using a processing stage such that a particular repetition of the repeating subset of symbols of a first block and a corresponding particular repetition of the repeating subset of symbols of a second block are processed using a common processing scheme. The processing stage may be initialized based at least in part on the cell identifier or the frame number.

In some aspects, the method may include transmitting, by a base station, a cell identifier for a cell. In some aspects, the method may include transmitting, by the base station, a physical broadcast channel. The physical broadcast channel may include a plurality of sets of symbols. Each set of symbols, of the plurality of sets of symbols, may be scrambled with a respective scrambling sequence of a plurality of scrambling sequences. Each set of symbols, of the plurality of sets of symbols, may be associated with at least one phase rotation. The at least one phase rotation may be based at least in part on the cell identifier for the cell.

In some aspects, the device may include a memory and one or more processors coupled to the memory. The memory and the one or more processors may be configured to transmit a cell identifier for a cell. The memory and the one or more processors may be configured to transmit a physical broadcast channel. The physical broadcast channel may include a plurality of sets of symbols. Each set of symbols, of the plurality of sets of symbols, may be scrambled with a respective scrambling sequence of a plurality of scrambling sequences. Each set of symbols, of the plurality of sets of symbols, may be associated with at least one phase rotation. The at least one phase rotation may be based at least in part on the cell identifier for the cell.

In some aspects, the apparatus may include means for transmitting a cell identifier for a cell. The apparatus may include means for transmitting a physical broadcast channel. The physical broadcast channel may include a plurality of sets of symbols. Each set of symbols, of the plurality of sets of symbols, may be scrambled with a respective scrambling sequence of a plurality of scrambling sequences. Each set of symbols, of the plurality of sets of symbols, may be associated with at least one phase rotation. The at least one phase rotation may be based at least in part on the cell identifier for the cell.

In some aspects, the computer program product may include a non-transitory computer-readable medium storing one or more instructions for wireless communication that, when executed by one or more processors of a device, cause the one or more processors to transmit a cell identifier for a cell. The one or more instructions may cause the one or more processors to transmit a physical broadcast channel. The physical broadcast channel may include a plurality of sets of symbols. Each set of symbols, of the plurality of sets of symbols, may be scrambled with a respective scrambling sequence of a plurality of scrambling sequences. Each set of symbols, of the plurality of sets of symbols, may be associated with at least one phase rotation. The at least one phase rotation may be based at least in part on the cell identifier for the cell.

In some aspects, the method may include receiving, by a user equipment, a cell identifier for a cell. In some aspects, the method may include receiving, by the user equipment, a physical broadcast channel. The physical broadcast channel may include a plurality of sets of symbols. Each set of symbols, of the plurality of sets of symbols, may be scrambled with a respective scrambling sequence of a plurality of scrambling sequences. Each set of symbols, of the plurality of sets of symbols, may be associated with at least one phase rotation. The at least one phase rotation may be based at least in part on the cell identifier for the cell.

In some aspects, the device may include a memory and one or more processors coupled to the memory. The memory and the one or more processors may be configured to receive a cell identifier for a cell. The memory and the one or more processors may be configured to receive a physical broadcast channel. The physical broadcast channel may include a plurality of sets of symbols. Each set of symbols, of the plurality of sets of symbols, may be scrambled with a respective scrambling sequence of a plurality of scrambling sequences. Each set of symbols, of the plurality of sets of symbols, may be associated with at least one phase rotation. The at least one phase rotation may be based at least in part on the cell identifier for the cell.

In some aspects, the apparatus may include means for receiving a cell identifier for a cell. The apparatus may include means for receiving a physical broadcast channel. The physical broadcast channel may include a plurality of sets of symbols. Each set of symbols, of the plurality of sets of symbols, may be scrambled with a respective scrambling sequence of a plurality of scrambling sequences. Each set of symbols, of the plurality of sets of symbols, may be associated with at least one phase rotation. The at least one phase rotation may be based at least in part on the cell identifier for the cell.

In some aspects, the computer program product may include a non-transitory computer-readable medium storing one or more instructions for wireless communication that, when executed by one or more processors of a device, cause the one or more processors to receive a cell identifier for a cell. The one or more instructions may cause the one or more processors to receive a physical broadcast channel. The physical broadcast channel may include a plurality of sets of symbols. Each set of symbols, of the plurality of sets of symbols, may be scrambled with a respective scrambling sequence of a plurality of scrambling sequences. Each set of symbols, of the plurality of sets of symbols, may be associated with at least one phase rotation. The at least one phase rotation may be based at least in part on the cell identifier for the cell.

In some aspects, the method may include transmitting, by a base station associated with a cell identifier for a cell, a channel, wherein each block, of a plurality of blocks of the channel, includes repetitions of sets of symbols, wherein each block, of the plurality of blocks, is scrambled using a scrambling sequence, of a plurality of scrambling sequences, initialized based at least in part on a block index of the block and the cell identifier for the cell, and wherein each repetition of the repetitions of sets of symbols, for each block is rotated using a different rotation sequence, of a plurality of rotation sequences, initialized based at least in part on a repetition index of the repetition.

In some aspects, the device may include a memory and one or more processors coupled to the memory. The memory and the one or more processors may be configured to transmit a channel, wherein each block, of a plurality of blocks of the channel, includes repetitions of sets of symbols, wherein each block, of the plurality of blocks, is scrambled using a scrambling sequence, of a plurality of scrambling sequences, initialized based at least in part on a block index of the block and a cell identifier for a cell, and wherein each repetition of the repetitions of sets of symbols, for each block is rotated using a different rotation sequence, of a plurality of rotation sequences, initialized based at least in part on a repetition index of the repetition.

In some aspects, the apparatus may include means for transmitting a channel, wherein each block, of a plurality of blocks of the channel, includes repetitions of sets of symbols, wherein each block, of the plurality of blocks, is scrambled using a scrambling sequence, of a plurality of scrambling sequences, initialized based at least in part on a block index of the block and a cell identifier for a cell, and wherein each repetition of the repetitions of sets of symbols, for each block is rotated using a different rotation sequence, of a plurality of rotation sequences, initialized based at least in part on a repetition index of the repetition.

In some aspects, the computer program product may include a non-transitory computer-readable medium storing one or more instructions for wireless communication that, when executed by one or more processors of a device, cause the one or more processors to transmit a channel, wherein each block, of a plurality of blocks of the channel, includes repetitions of sets of symbols, wherein each block, of the plurality of blocks, is scrambled using a scrambling sequence, of a plurality of scrambling sequences, initialized based at least in part on a block index of the block and a cell identifier for a cell, and wherein each repetition of the repetitions of sets of symbols, for each block is rotated using a different rotation sequence, of a plurality of rotation sequences, initialized based at least in part on a repetition index of the repetition.

In some aspects, the method may include receiving, by a user equipment and from a base station associated with a cell identifier for a cell, a channel, wherein each block, of a plurality of blocks of the channel, includes repetitions of sets of symbols, wherein each block, of the plurality of blocks, is scrambled using a scrambling sequence, of a plurality of scrambling sequences, initialized based at least in part on a block index of the block and the cell identifier for the cell, and wherein each repetition, of the repetitions of sets of symbols, for each block is rotated using a different rotation sequence, of a plurality of rotation sequences, initialized based at least in part on a repetition index of the repetition.

In some aspects, the device may include a memory and one or more processors coupled to the memory. The memory and the one or more processors may be configured to receive, from a base station associated with a cell identifier for a cell, a channel, wherein each block, of a plurality of blocks of the channel, includes repetitions of sets of symbols, wherein each block, of the plurality of blocks, is scrambled using a scrambling sequence, of a plurality of scrambling sequences, initialized based at least in part on a block index of the block and the cell identifier for the cell, and wherein each repetition, of the repetitions of sets of symbols, for each block is rotated using a different rotation sequence, of a plurality of rotation sequences, initialized based at least in part on a repetition index of the repetition.

In some aspects, the apparatus may include means for receiving, from a base station associated with a cell identifier for a cell, a channel, wherein each block, of a plurality of blocks of the channel, includes repetitions of sets of symbols, wherein each block, of the plurality of blocks, is scrambled using a scrambling sequence, of a plurality of scrambling sequences, initialized based at least in part on a block index of the block and the cell identifier for the cell, and wherein each repetition, of the repetitions of sets of symbols, for each block is rotated using a different rotation sequence, of a plurality of rotation sequences, initialized based at least in part on a repetition index of the repetition.

In some aspects, the computer program product may include a non-transitory computer-readable medium storing one or more instructions for wireless communication that, when executed by one or more processors of a device, cause the one or more processors to receive, from a base station associated with a cell identifier for a cell, a channel, wherein each block, of a plurality of blocks of the channel, includes repetitions of sets of symbols, wherein each block, of the plurality of blocks, is scrambled using a scrambling sequence, of a plurality of scrambling sequences, initialized based at least in part on a block index of the block and the cell identifier for the cell, and wherein each repetition, of the repetitions of sets of symbols, for each block is rotated using a different rotation sequence, of a plurality of rotation sequences, initialized based at least in part on a repetition index of the repetition.

In some aspects, the method may include transmitting, by a base station associated with a cell identifier for a cell, a channel, wherein the channel includes a plurality of repetitions of a set of bits in a plurality of subframes, and wherein each repetition, of the plurality of repetitions, is scrambled using a different scrambling sequence, of a plurality of different scrambling sequences, initialized based at least in part on a non-linear combination of the cell identifier and a repetition index.

In some aspects, the device may include a memory and one or more processors coupled to the memory. The memory and the one or more processors may be configured to transmit a channel, wherein the channel includes a plurality of repetitions of a set of bits in a plurality of subframes, and wherein each repetition, of the plurality of repetitions, is scrambled using a different scrambling sequence, of a plurality of different scrambling sequences, initialized based at least in part on a non-linear combination of a cell identifier for a cell and a repetition index.

In some aspects, the apparatus may include means for transmitting a channel, wherein the channel includes a plurality of repetitions of a set of bits in a plurality of subframes, and wherein each repetition, of the plurality of repetitions, is scrambled using a different scrambling sequence, of a plurality of different scrambling sequences, initialized based at least in part on a non-linear combination of a cell identifier for a cell and a repetition index.

In some aspects, the computer program product may include a non-transitory computer-readable medium storing one or more instructions for wireless communication that, when executed by one or more processors of a device, cause the one or more processors to transmit a channel, wherein the channel includes a plurality of repetitions of a set of bits in a plurality of subframes, and wherein each repetition, of the plurality of repetitions, is scrambled using a different scrambling sequence, of a plurality of different scrambling sequences, initialized based at least in part on a non-linear combination of a cell identifier for a cell and a repetition index.

In some aspects, the method may include receiving, by a user equipment and from a base station associated with a cell identifier for a cell, a channel, wherein the channel includes a plurality of repetitions of a set of bits in a plurality of subframes, and wherein each repetition, of the plurality of repetitions, is scrambled using a different scrambling sequence, of a plurality of different scrambling sequences, initialized based at least in part on a non-linear combination of the cell identifier and a repetition index.

In some aspects, the device may include a memory and one or more processors coupled to the memory. The memory and the one or more processors may be configured to receive, from a base station associated with a cell identifier for a cell, a channel, wherein the channel includes a plurality of repetitions of a set of bits in a plurality of subframes, and wherein each repetition, of the plurality of repetitions, is scrambled using a different scrambling sequence, of a plurality of different scrambling sequences, initialized based at least in part on a non-linear combination of the cell identifier and a repetition index.

In some aspects, the apparatus may include means for receiving, from a base station associated with a cell identifier for a cell, a channel, wherein the channel includes a plurality of repetitions of a set of bits in a plurality of subframes, and wherein each repetition, of the plurality of repetitions, is scrambled using a different scrambling sequence, of a plurality of different scrambling sequences, initialized based at least in part on a non-linear combination of the cell identifier and a repetition index.

In some aspects, the computer program product may include a non-transitory computer-readable medium storing one or more instructions for wireless communication that, when executed by one or more processors of a device, cause the one or more processors to receive, from a base station associated with a cell identifier for a cell, a channel, wherein the channel includes a plurality of repetitions of a set of bits in a plurality of subframes, and wherein each repetition, of the plurality of repetitions, is scrambled using a different scrambling sequence, of a plurality of different scrambling sequences, initialized based at least in part on a non-linear combination of the cell identifier and a repetition index.

Aspects generally include a method, apparatus, system, computer program product, non-transitory computer-readable medium, user equipment, base station, wireless communication device, access point, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
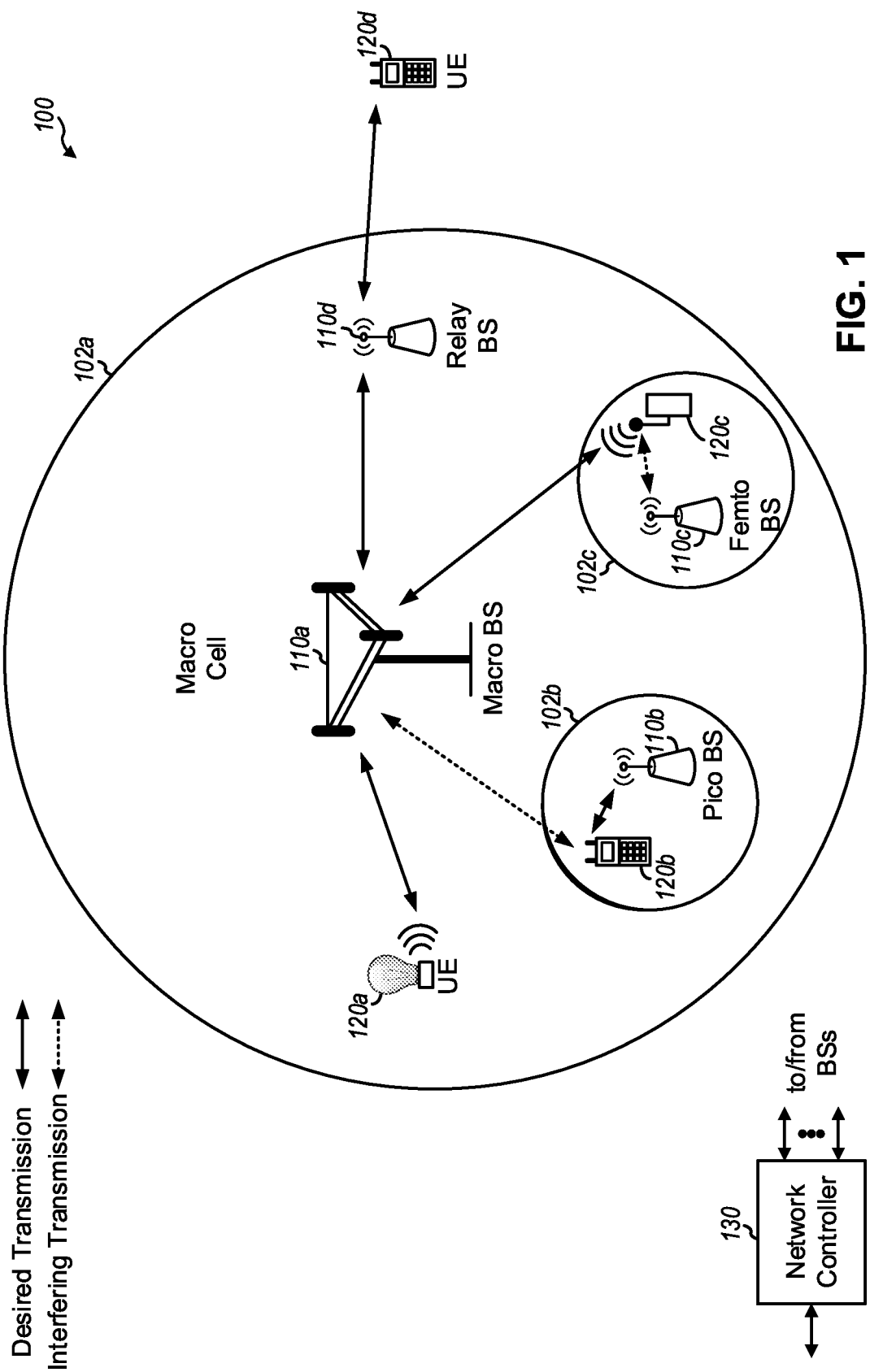
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point (AP) may comprise, be implemented as, or known as a NodeB, a Radio Network Controller ("RNC"), an eNodeB (eNB), a Base Station Controller (BSC), a Base Transceiver Station ("BTS"), a Base Station (BS), a Transceiver Function (TF), a Radio Router, a Radio Transceiver, a Basic Service Set (BSS), an Extended Service Set (ESS), a Radio Base Station (RBS), a Node B (NB), a gNB, a 5G NB, a NR BS, a Transmit Receive Point (TRP), or some other terminology.

An access terminal (AT) may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol (SIP) phone, a wireless local loop (WLL) station, a personal digital assistant (PDA), a tablet, a netbook, a smartbook, an ultrabook, a handheld device having wireless connection capability, a Station (STA), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, network controller 130 may communicate with the BSs to determine a scrambling sequence that is to be used for a first processing stage, a second processing stage, and/or the like. For example, network controller 130 may determine that a first cell associated with a first BS is to use a first scrambling sequence for the second processing stage and a second cell associated with a second BS is to use a second scrambling sequence for the second processing stage. Additionally, or alternatively, network controller 130 may determine that BSs are to perform a set of phase rotations during the second processing stage. Additionally, or alternatively, network controller 130 may determine that BSs are to offset bits based at least in part on an offset sequence selected based at least in part on respective physical cell IDs (PCIDs), pseudo-random sequences, and/or the like during the second processing stage.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone, such as UEs 120b and/or 120d), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices (e.g., such as UE 120c), wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, a smart home device (e.g., a smart appliance, a smart light bulb, such as UE 120a) or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates candidate transmissions between a UE and a serving BS, which is a BS designated to serve the UE on the downlink and/or uplink. A dashed line with double arrows indicates potentially interfering transmissions between a UE and a BS. For example, an interference-limited scenario with synchronous cells may occur when macro BS 110a is operating synchronously with pico BS 110b resulting in a transmission of a physical broadcast channel from macro BS 110a to UE 120a interfering with a transmission of a physical broadcast channel from pico BS 110b to UE 120b. Similarly, an interference-limited scenario with synchronous cells may occur when a physical broadcast transmission of femto BS 110*c* interferes with the physical broadcast transmission of macro BS 110*a* to UE 120*c*. In some aspects, BSs, such as macro BS 110*a* and pico BS 110*b*, may transmit respective physical broadcast channels with bits that are processed using a first processing stage, such as using a first scrambling sequence initialized based at least in part on a cell identifier, and that are processed using a second processing stage, such as using a second scrambling sequence initialized based at least in part on the cell identifier, to reduce interference and to permit a UE, such as UE 120*b*, to receive the physical broadcast channel and determine information conveyed by the physical broadcast channel.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station, a network controller, a user equipment, etc.) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. For example, the scheduling entity may schedule transmission of physical broadcast channels, such as a narrowband physical broadcast channel (NB-PBCHs), from BSs to UEs. In some aspects, such scheduling information may be communicated via signaling from the scheduling entity. For example, a UE may receive a system information block (SIB) message, identifying a resource allocation for the physical broadcast channel, a set of scrambling sequences to be applied during processing stages to bits of the physical broadcast channel, a phase rotation to be applied to symbols of the physical broadcast channel, an offset sequence to be applied to bits of the physical broadcast channel, and/or the like.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
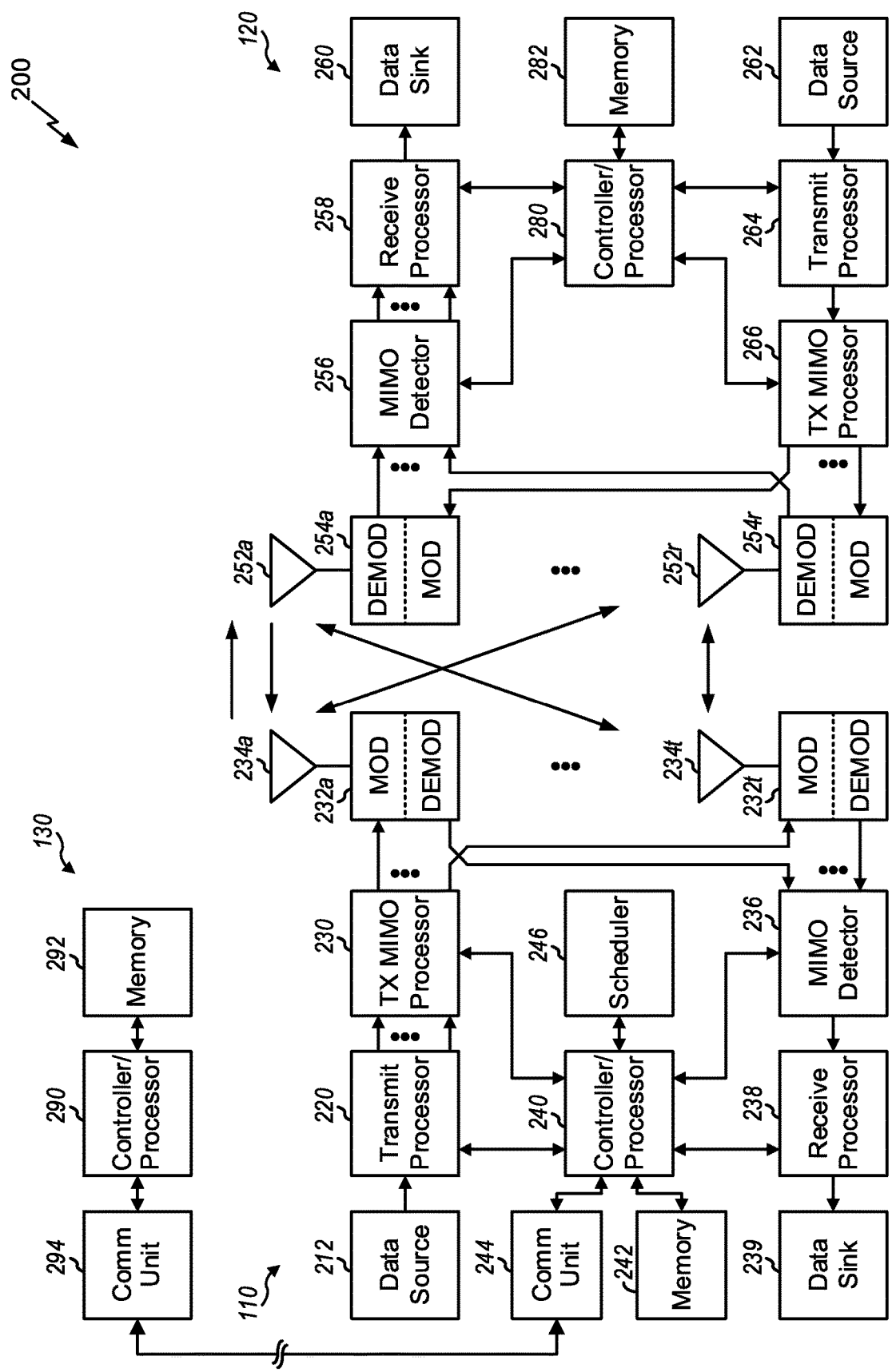
FIG. 2 is a diagram illustrating an example of a base station (BS) in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. Each modulator 232 and/or another component, such as transmit processor 220, TX MIMO processor 230, controller/processor 240, and/or the like, may further process modulated symbols (e.g., IQ symbols) of a physical broadcast channel (e.g., QPSK symbols) to apply a phase rotation to the modulated symbols based at least in part on a cell identifier, such as a cell identity (cell ID or CID). In some aspects, each modulator 232 and/or another component, such as transmit processor 220, TX MIMO processor 230, controller/processor 240, and/or the like, may further process modulated symbols of the physical broadcast channel to apply a first processing stage (e.g., a set of scrambling sequences applied to a set of blocks), to apply a second processing stage (e.g., a set of scrambling sequences applied to repetitions of a repeating subset of bits of each block), and/or the like. T downlink signals from modulators 232*a* through 232*t* may be transmitted via T antennas 234*a* through 234*t*, respectively. According to certain aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. Each demodulator 254 and/or another component, such as MIMO detector 256, receiver processor 258, controller/processor 280, and/or the like, may further process the input samples to reverse the processing of bits included in a physical broadcast channel, as described in more detail herein. A MIMO detector 256 may obtain received symbols from all R demodulators 254*a* through 254*r*, perform MIMO detection on the received symbols if applicable, and provide detected symbols. A receive processor 258 may process (e.g., de-rotate, demodulate, decode, or de-scramble) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively. For example, controller/processor 240 and/or other processors and modules at base station 110 may transmit a cell identifier (e.g., a cell identity) for a cell to enable UE 120 to reverse processing stages (e.g., scrambling sequences initialized based at least in part on the cell identifier) applied to bits of a physical broadcast channel. In some aspects, controller/processor 240 of base station 110 and/or other processors and modules at base station 110 may transmit a physical broadcast channel that includes, for example, blocks of repetitions of subsets of bits that are scrambled based at least in part on a cell identifier associated with base station 110. In some aspects, controller/processor 280 and/or one or more other processors and modules at UE 120 may receive a cell identifier from base station 110. In some aspects, controller/processor 280 and/or one or more other processors and modules at UE 120 may receive a physical broadcast channel including blocks of repetitions of repeating subsets of bits that are scrambled based at least in part on the cell identifier.

For example, controller/processor 240 and/or other processors and modules at base station 110 may cause a transmission of the cell identifier (e.g., a cell identity) for the cell to enable UE 120 to de-rotate phase-rotated symbols of a physical broadcast channel, to de-scramble scrambled blocks of a physical broadcast channel, and/or the like. In some aspects, controller/processor 240 of base station 110 and/or other processors and modules at base station 110 may transmit a physical broadcast channel that includes, for example, sets of symbols associated with at least one phase rotation based at least in part on a cell identifier associated with base station 110. In some aspects, controller/processor 280 and/or one or more other processors and modules at UE 120 may receive a cell identifier from base station 110. In some aspects, controller/processor 280 and/or one or more other processors and modules at UE 120 may receive a physical broadcast channel including sets of symbols phase-rotated based at least in part on the cell identifier.

Figure 8:
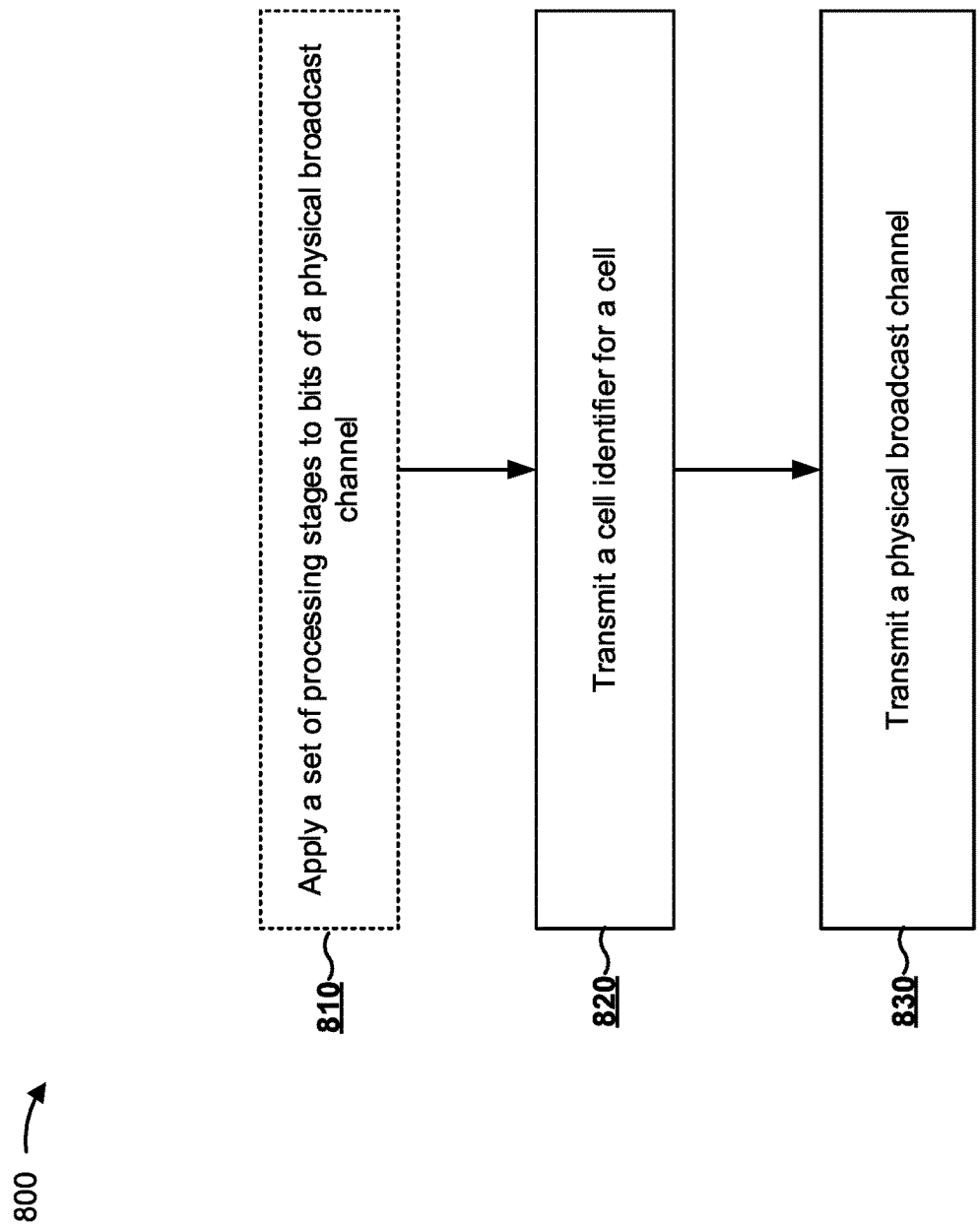
FIG. 8 is a flow chart of a method of wireless communication.
Figure 9:
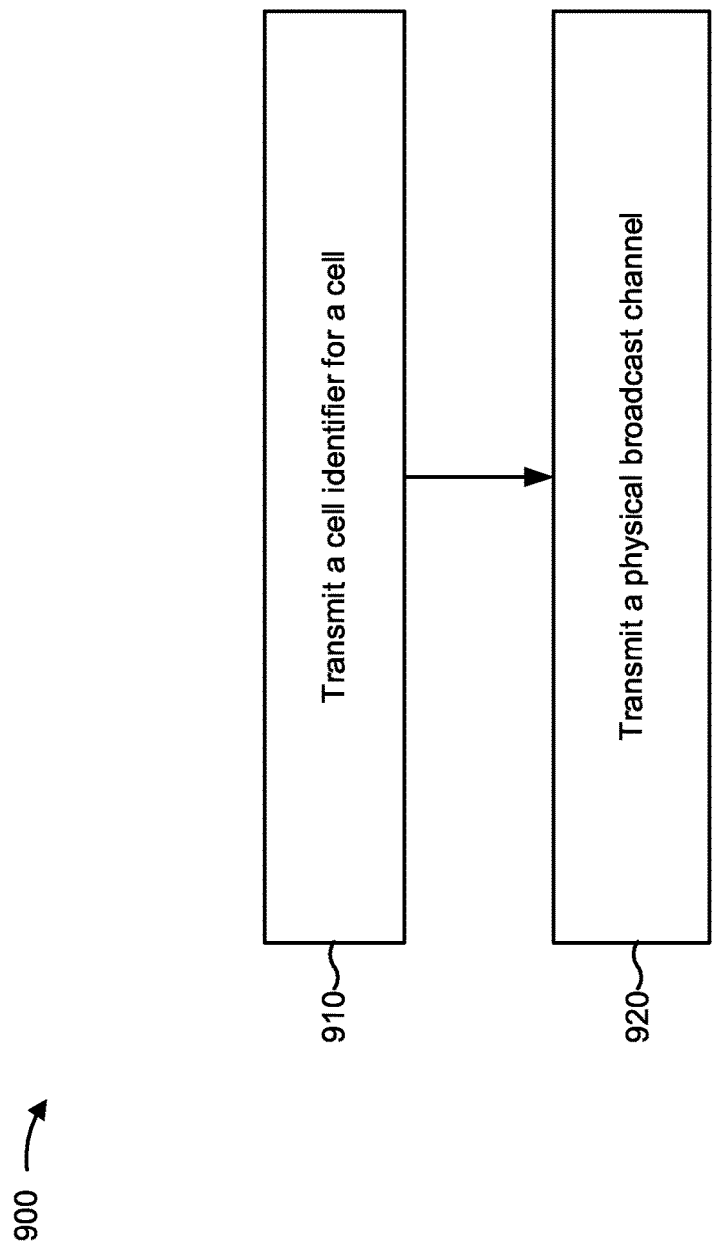
FIG. 9 is a flow chart of another method of wireless communication.
Figure 10:
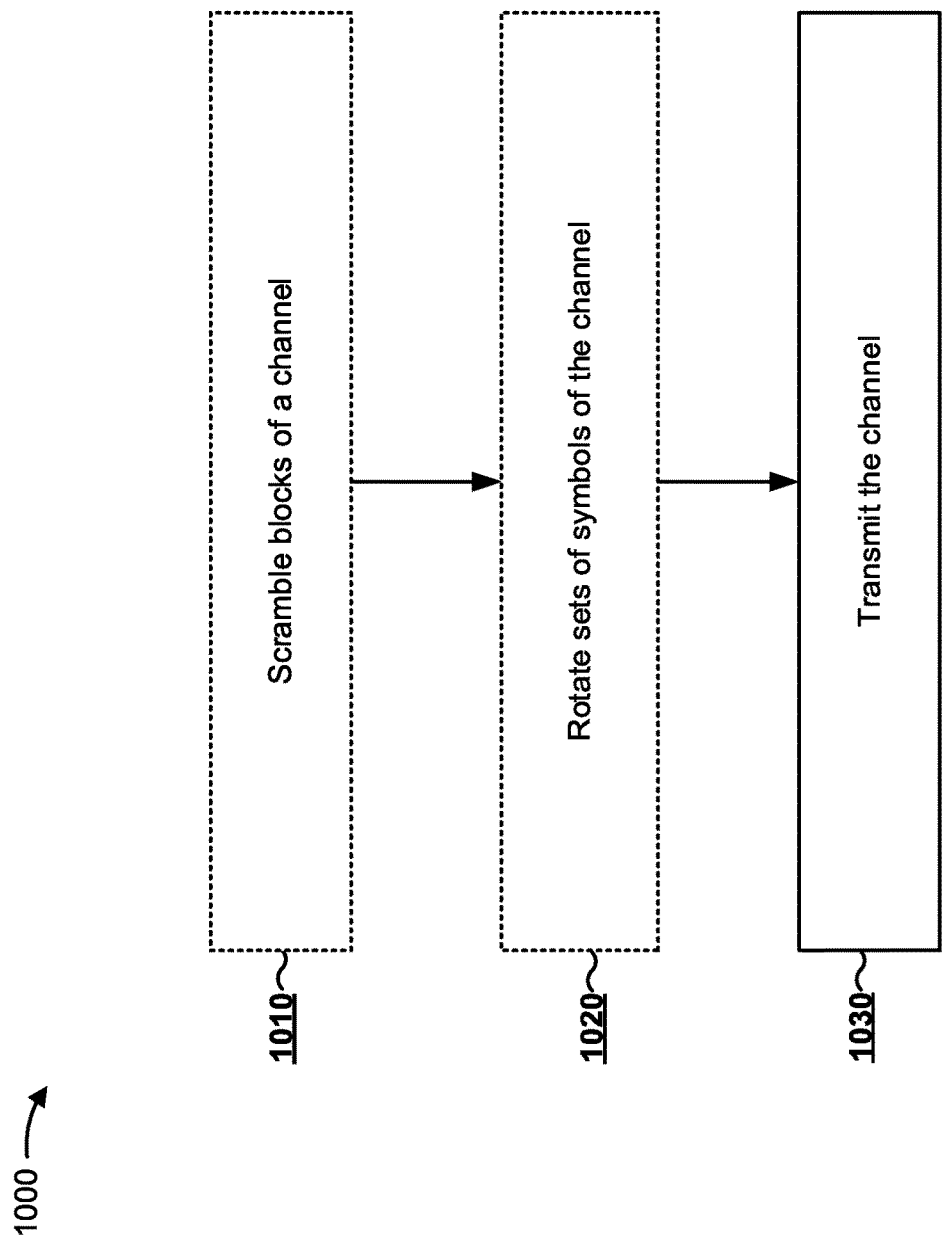
FIG. 10 is a flow chart of another method of wireless communication.
Figure 11:
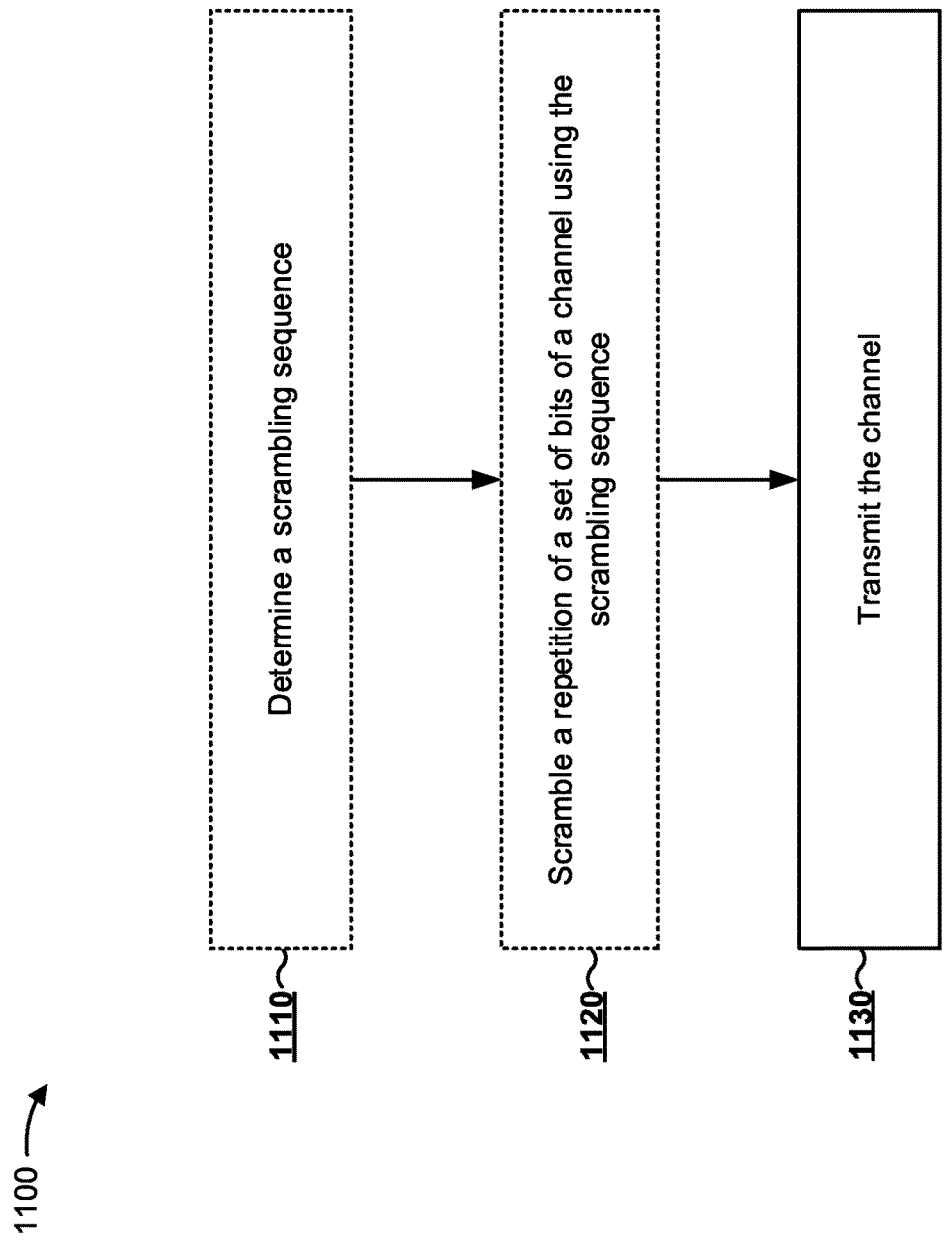
FIG. 11 is a flow chart of another method of wireless communication.
Figure 14:
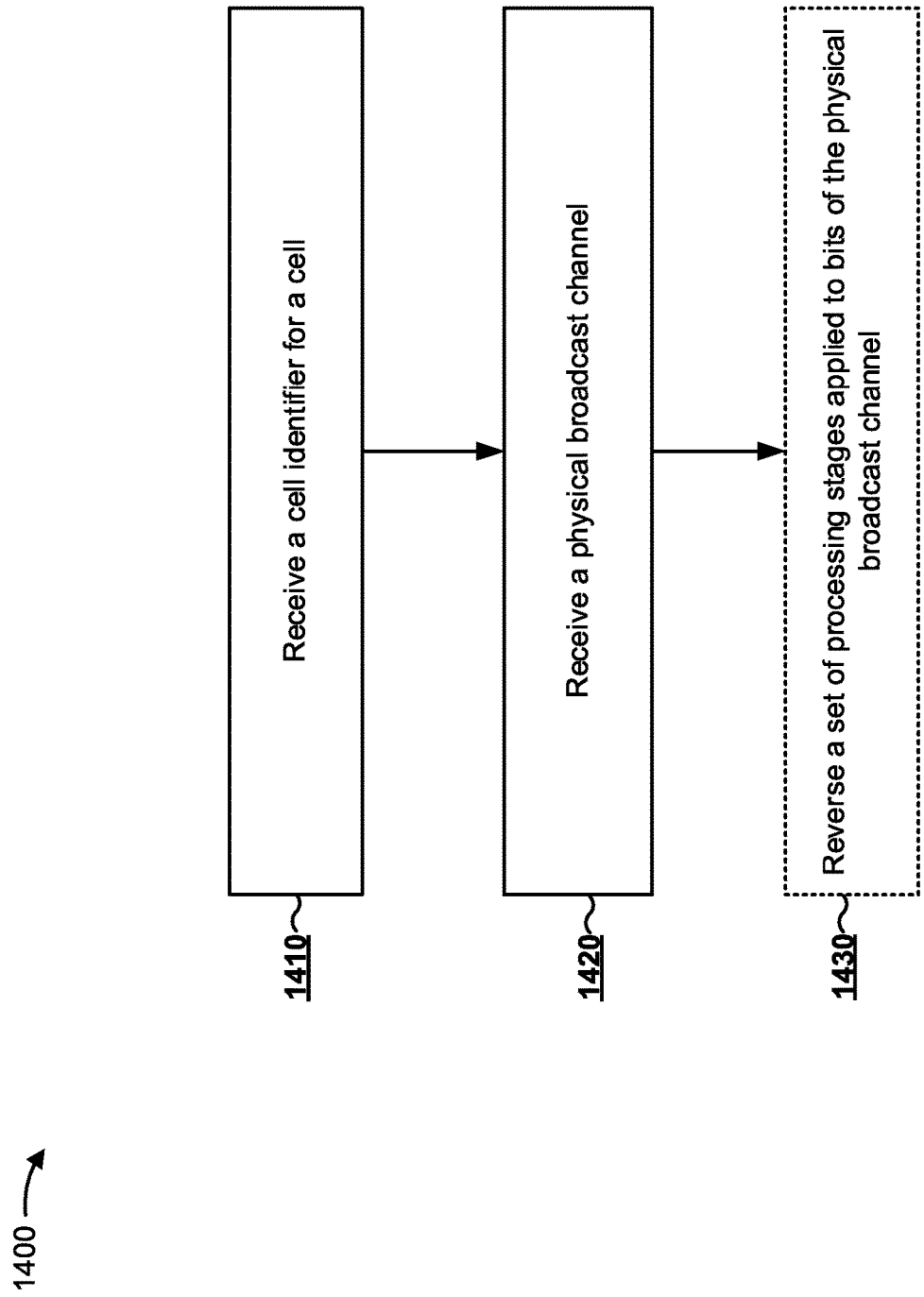
FIG. 14 is a flow chart of another method of wireless communication.
Figure 15:
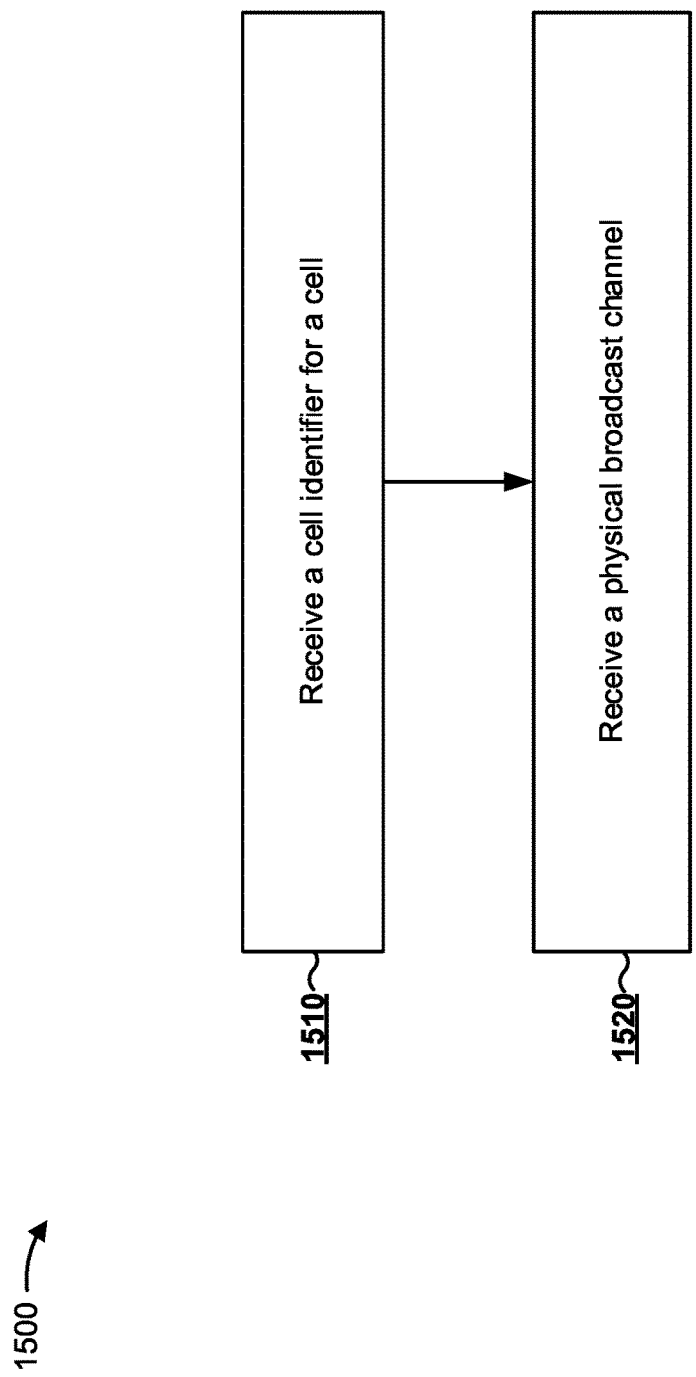
FIG. 15 is a flow chart of another method of wireless communication.
Figure 16:
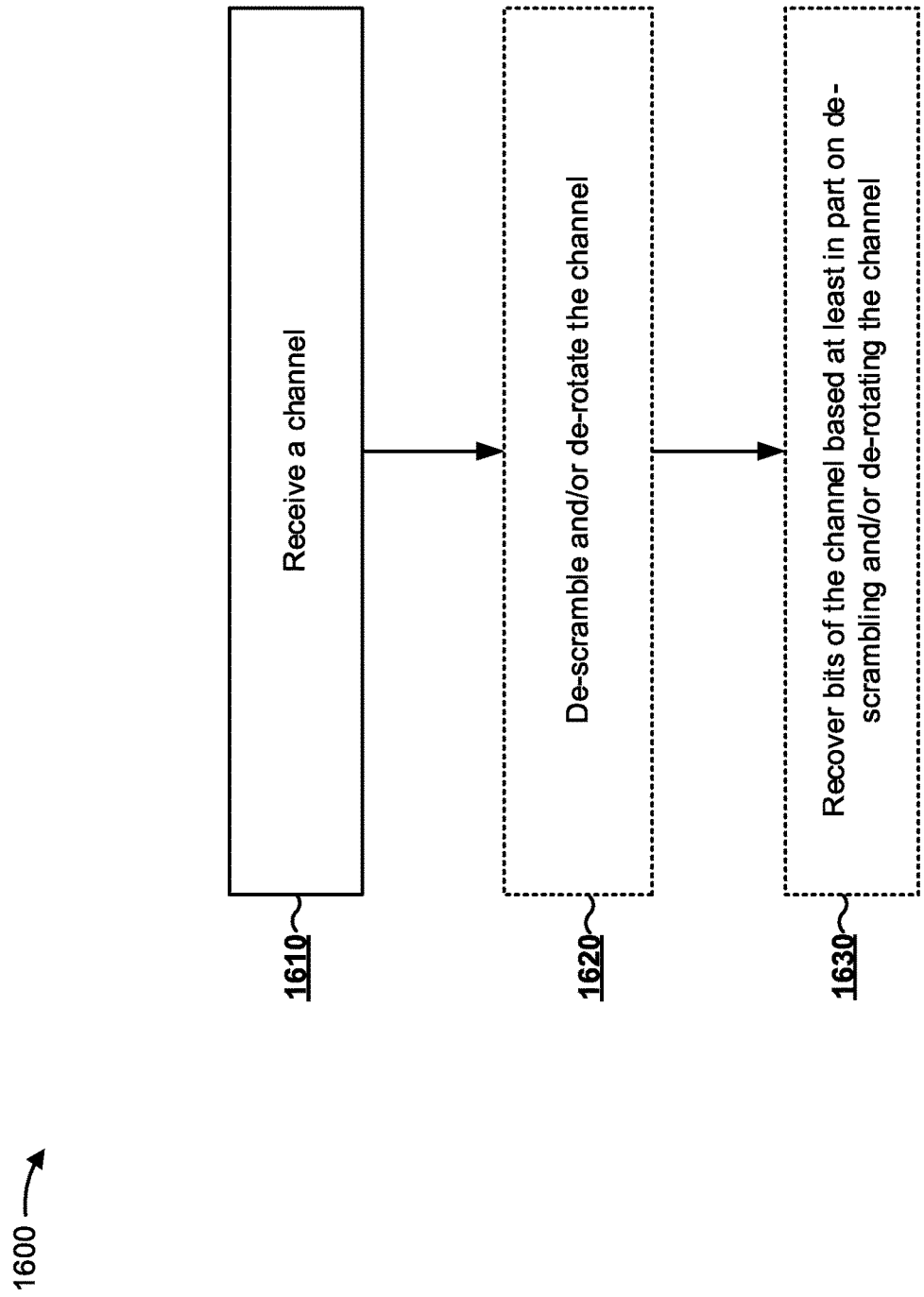
FIG. 16 is a flow chart of another method of wireless communication.
Figure 17:
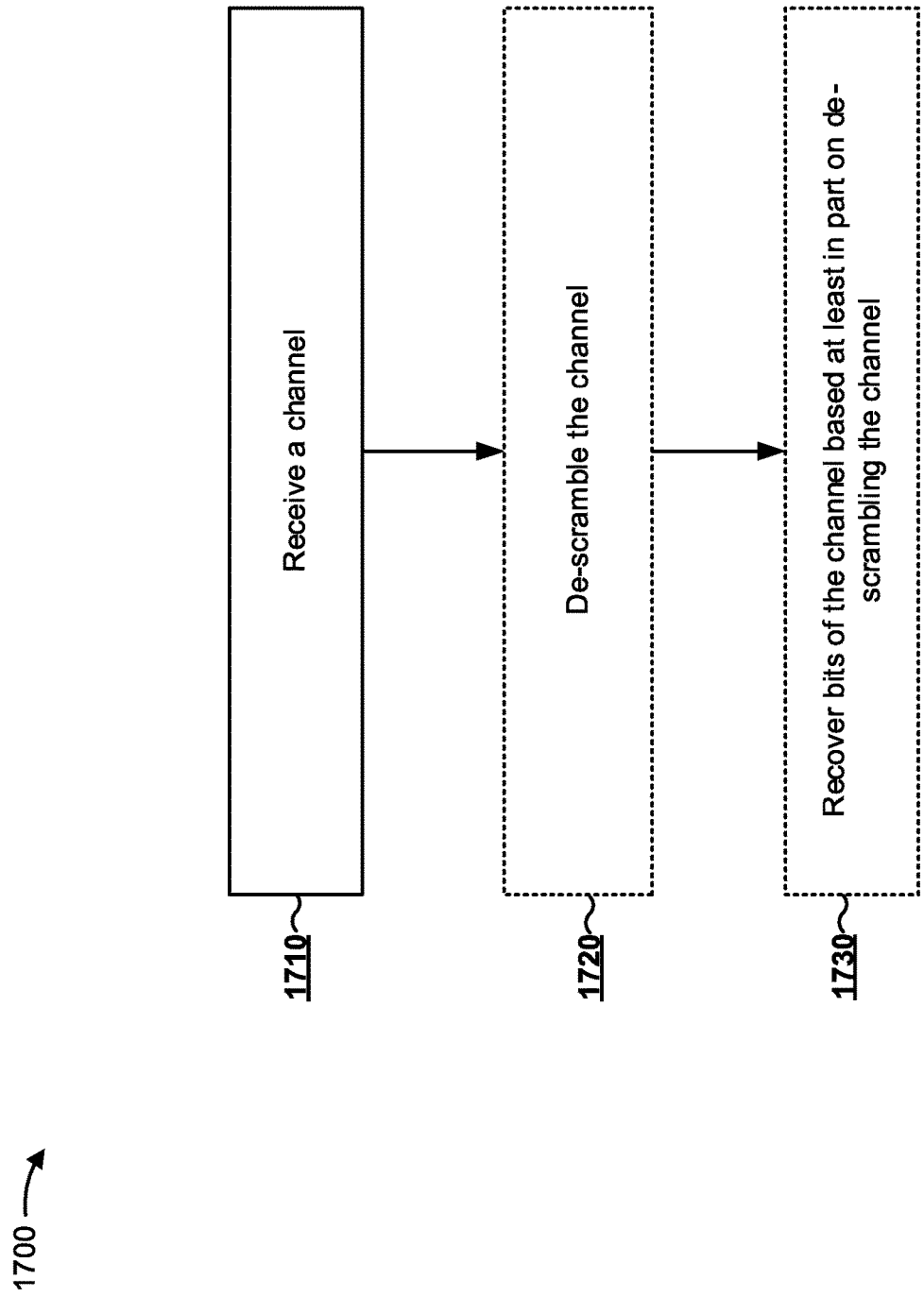
FIG. 17 is a flow chart of another method of wireless communication.

In some aspects, one or more of the components shown in FIG. 2 may be employed to perform example method 800 of FIG. 8, example method 900 of FIG. 9, example method 1000 of FIG. 10, example method 1100 of FIG. 11, example method 1400 of FIG. 14, example method 1500 of FIG. 15, example method 1600 of FIG. 16, example method 1700 of FIG. 17, and/or other processes for the techniques described herein. Memories 242 and 282 may store data and program codes for BS 110 and UE 120, respectively.

A scheduler 246 may schedule UEs for data transmission on the downlink and/or uplink. For example, scheduler 246 may schedule a base station 110 to transmit a cell identifier and to transmit a physical broadcast channel, and may cause UE 120 to receive the cell identifier and to receive the physical broadcast channel. In some aspects, scheduler 246 may schedule base station 110 to transmit the cell identifier and to transmit the physical broadcast channel concurrently, consecutively, and/or the like. In some aspects, scheduler 246 may schedule UE 120 to receive the cell identifier and to receive the physical broadcast channel concurrently, consecutively, and/or the like.

As indicated above, FIG. 2 is provided merely as an example. Other examples are possible and may differ from what was described with regard to FIG. 2.

Figure 3:
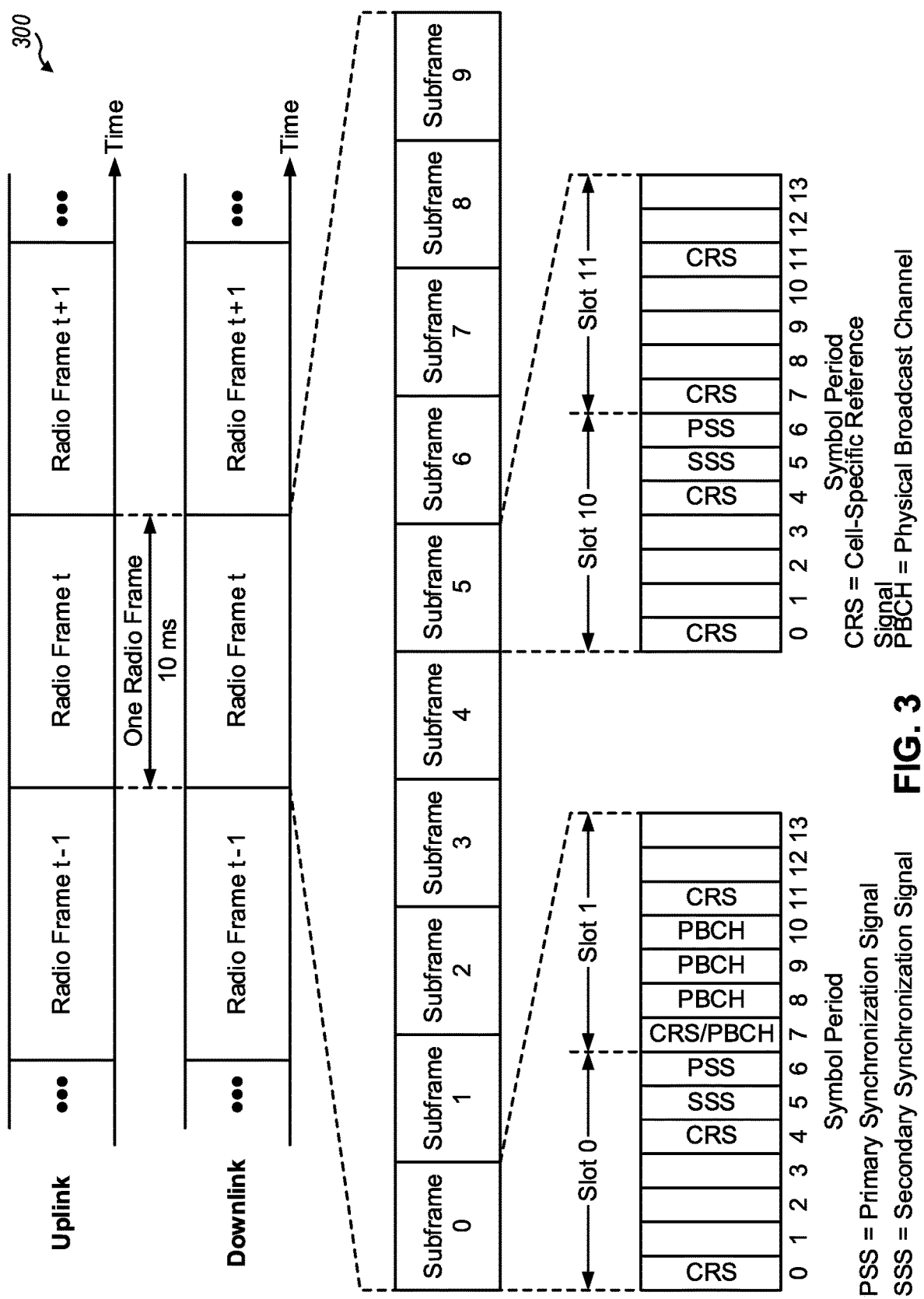
FIG. 3 is a diagram illustrating an example of a frame structure in a wireless communication network.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search, acquisition, cell identity determination, de-scrambling, and phase de-rotation. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH), such as a narrowband PBCH (NB-PBCH), in symbol periods 0 to 3 in slot 1 of certain radio frames. The PBCH may carry some system information.

In some aspects, a master information block (MIB) is encoded for an NB-PBCH to obtain a quantity of L bits for rate matching. The quantity of L bits may be scrambled, in a first processing stage, and may be partitioned into N blocks. For example, the MIB may be encoded for a total of 1600 bits, which may be scrambled during a first processing stage using a first scrambling sequence and which may be divided into 8 blocks of 200 bits in each block. Each block may include repetitions of a repeating subset of bits, with the repetitions being transmitted during a particular quantity of radio frames. For example, repetitions of a repeating subset of bits of a first block may be transmitted during radio frames 0, 1, 2, 3, 4, 5, 6, and 7, and repetitions of a repeating subset of bits of a second block may be transmitted during radio frames 8, 9, 10, 11, 12, 13, 14, and 15.

In some aspects, the BS may apply a second processing stage to the repetitions of the repeating subsets of bits of each block. For example, the BS may apply a set of scrambling sequences such that, for example, a particular repetition of the repeating subset of bits of a first block (e.g., the subset of bits for transmission in radio frame 0) and a corresponding particular repetition of the repeating subset of bits of a second block (e.g., the subset of bits for transmission in radio frame 8) are processed using a common processing scheme (e.g., the same scrambling sequence). In some aspects, the BS may modulate the repetitions of the repeating subsets of bits into symbols, and may apply a phase rotation to the symbols during the second processing stage. In some aspects, the BS may apply an offset sequence to repetitions of the repeating subset of bits. For example, the BS may offset repetitions of the repeating subset of bits by a first quantity of resource elements when mapping resource elements to subframes, and another BS may offset repetitions of another repeating subset of bits by a second, different quantity of resource elements when mapping resource elements to subframes. In this way, the BS may reduce interference or randomize the interference between NB-PBCHs provided by the BS and the other BS.

The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
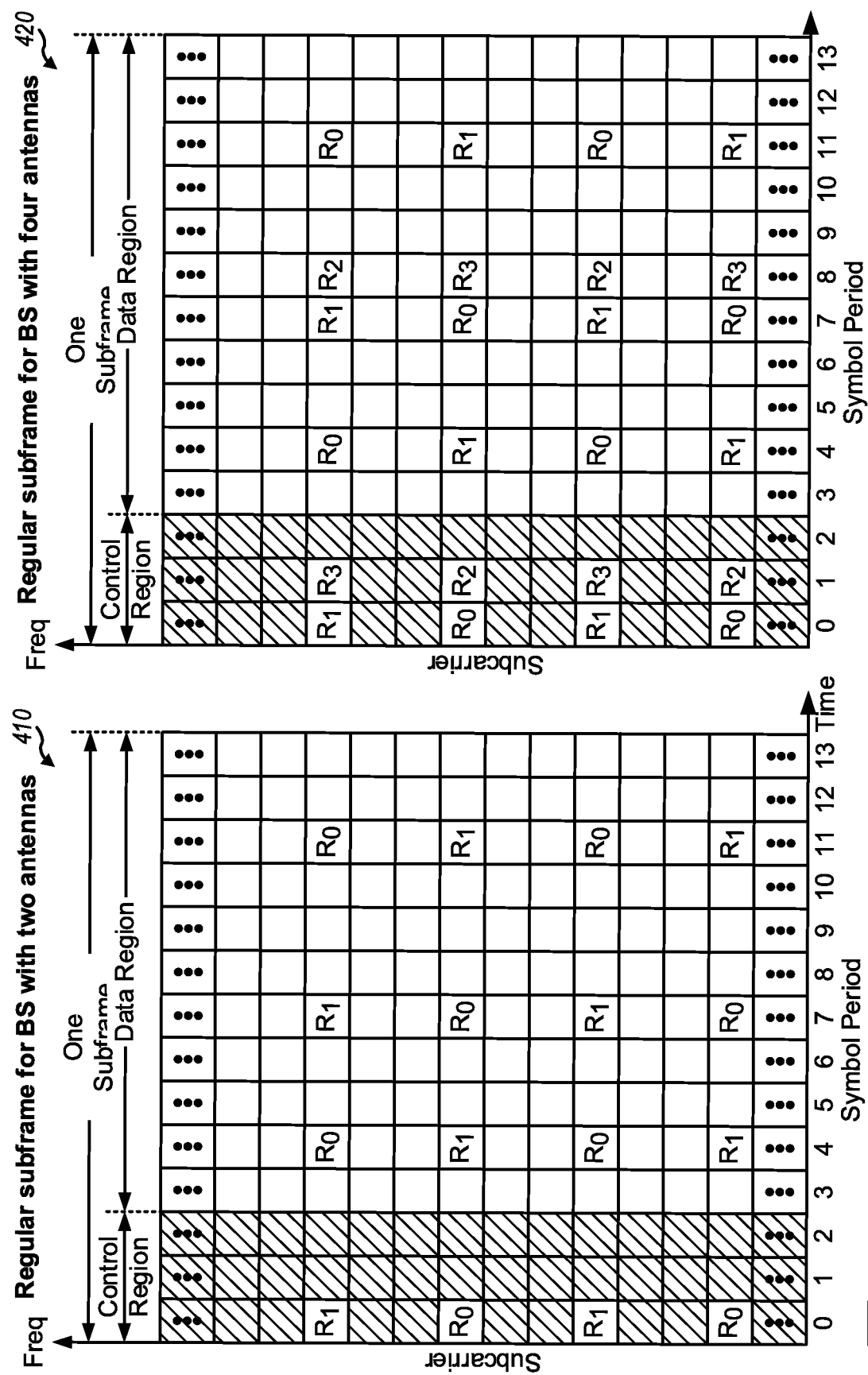
FIG. 4 is a diagram illustrating two example subframe formats with a normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Bits of the modulation symbol may be processed using a first processing stage and a second processing stage based at least in part on a cell ID to compensate for interference on a physical broadcast channel. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where q∈{0, . . . , Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario (an interference-limited scenario) in which the UE may observe high interference from one or more interfering BSs. In such a scenario, the BS may scramble, offset, and/or phase rotate bits that are transmitted via a physical broadcast channel based at least in part on, for example, a cell ID, and the UE may receive the physical broadcast channel and may de-scramble the bits, compensate for an offset of the bits, and/or de-rotate the bits based at least in part on a cell identifier, such as the cell ID.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
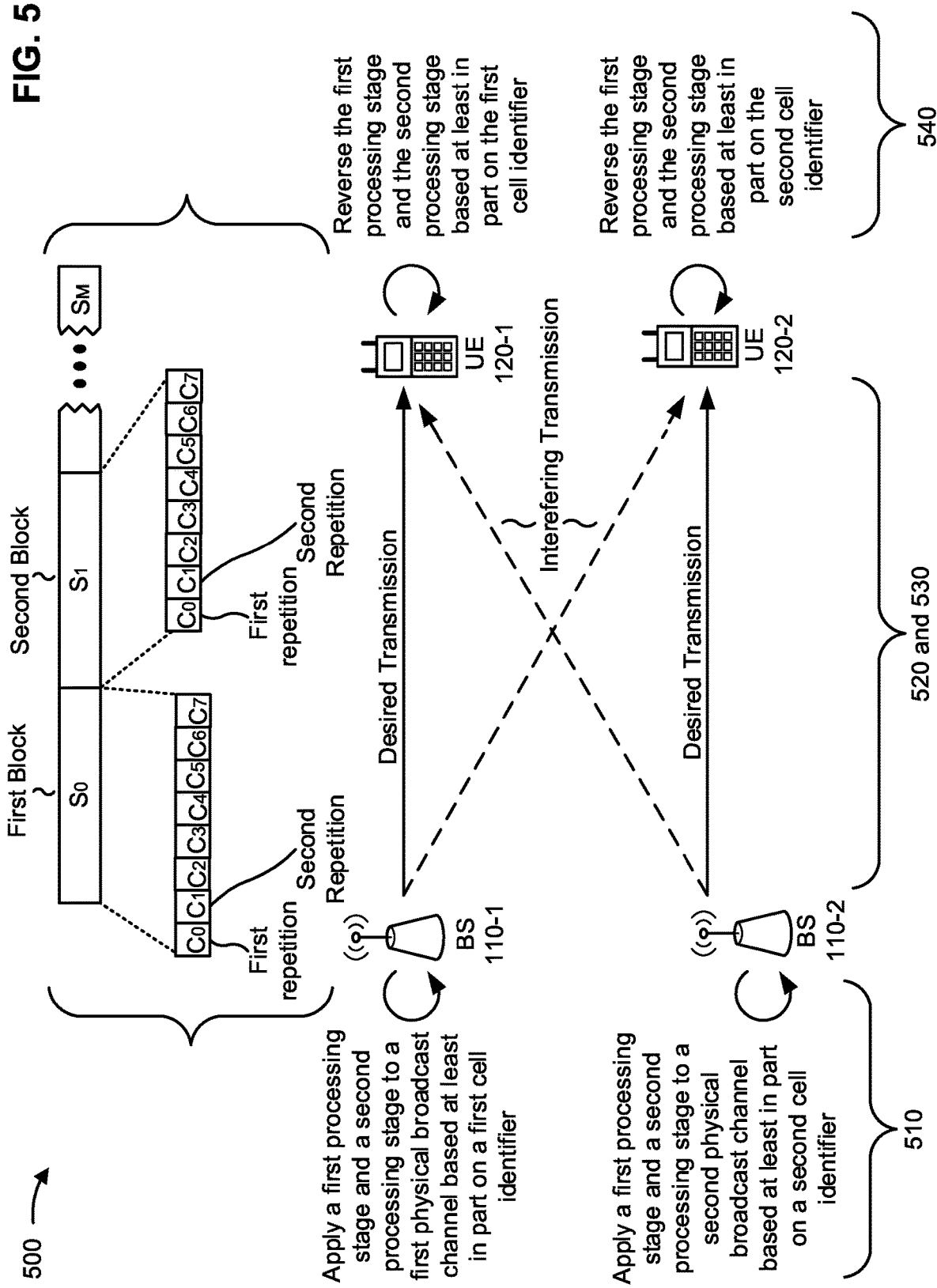
FIG. 5 is a diagram illustrating an example of a BS, in an interference-limited scenario with synchronous cells, transmitting a physical broadcast channel and a UE receiving the physical broadcast channel.

FIG. 5 is a diagram illustrating an example 500 of a BS, in an interference-limited scenario with synchronous cells, transmitting an NB-PBCH and a UE receiving the NB-PBCH. As shown in FIG. 5, example 500 may include BSs 110-1 and 110-2 (collectively referred to as BSs 110 and generally referred to as BS 110) and UEs 120-1 and 120-2 (collectively referred to as UEs 120 and generally referred to as UE 120).

At 510, BSs 110 may apply, respectively, a first processing stage to blocks of the respective NB-PBCHs and a second processing stage to repetitions of repeating subsets of bits of each block of the respective NB-PBCHs. For example, BS 110-1 may apply, during the first processing stage, a first set of scrambling sequences, $S=\{S_0, S_1, \ldots, S_M\}$, which are initialized based at least in part on a cell identity associated with BS 110-1, to the blocks of the first NB-PBCH. In this case, a first block may be scrambled using a first scrambling sequence, of the first set of scrambling sequences, $S_0$; a second block may be scrambled using a second scrambling sequence, of the first set of scrambling sequences, $S_1$; an nth block may be scrambled using an nth scrambling sequence, of the first set of scrambling sequences, $S_M$ (where M=N−1); and/or the like. In this case, the first set of scrambling sequences provides redundancy differentiation. In some aspects, BS 110-2 may apply a second set of scrambling sequences that is different from the first set of scrambling sequences.

In some aspects, the scrambling sequences of the first set of scrambling sequences may be portions of a single scrambling sequence. For example, a single scrambling sequence S may be used, such that $S_0$ is a first set of scrambling values of S, $S_1$ is a second set of scrambling values of S, . . . , and $S_M$ is an nth set of scrambling values of S. In some aspects, each scrambling sequence may include a plurality of scrambling values. For example, scrambling sequence $S_0$ may represent a set of scrambling values [s(0, 0), s(0, 1), s(0, 2), . . . ], such that s(i, j)=0 or 1.

In some aspects, BS 110-1 may apply, during the second processing stage, a second set of scrambling sequences, $C=\{C_0, C_1, \ldots, C_7\}$, to each repetition of a repeating subset of bits of a block. For example, BS 110-1 may apply scrambling sequence $C_0$ to a first repetition of a repeating subset of bits of the first block, scrambling sequence $C_1$ to a second repetition of the repeating subset of bits of the first block, etc. In some aspects, each repetition of the repeating subset of bits that is scrambled based at least in part on $C_0$, $C_1, \ldots, C_7$ is a repetition of a block rather than a repetition of a portion of a block. Similarly, BS 110-1 may apply the same scrambling sequence $C_0$ to a corresponding first repetition of a repeating subset of bits of the second block, the same scrambling sequence $C_1$ to a corresponding second repetition of the repeating subset of bits of the second block, etc. In this case, the second set of scrambling sequences provides inter-cell interference randomization to compensate for interference between, for example, BS 110-1 and BS 110-2 based at least in part on BS 110-2 applying a different set of scrambling sequences, C. Based at least in part on using the same scrambling sequence C for each block of the first NB-PBCH, BS 110-1 enables UE 120 to reverse the second processing stage with a reduced utilization of computing resources relative to using different scrambling sequences $C_{0,7}$, $C_{8,15}$, etc. for each block.

In some aspects, each scrambling sequence of the second set of scrambling sequences may include a plurality of tuples of bits, such as a plurality of quadruplets of four bits, for scrambling repetitions of the repeating subsets of bits. For example, scrambling sequence $C_0$ may include a set of bits of the form [0, 0, 0, 0, 1, 1, 1, 1, 1, 1, 1, 1, . . . ], scrambling sequence $C_1$ may include a set of bits [1, 1, 1, 1, 0, 0, 0, 0, 1, 1, 1, 1, . . . ], scrambling sequence $C_2$ may include a set of bits [1, 1, 1, 1, 1, 1, 1, 1, 1, 1, 1, 1,], etc. In this case, BS 110-1 may generate the second set of scrambling sequences based at least in part on repeating bits of another scrambling sequence. For example, for a scrambling sequence $S_0$=[0, 1, 1, . . . ], BS 110-1 may obtain $C_0$=[0, 0, 0, 0, 1, 1, 1, 1, 1, 1, 1, 1, . . . ]. In this case, a QPSK modulation symbol of two consecutive bits may be scrambled by [0, 0], which has the effect of multiplying the QPSK symbol by 1, or by [1, 1] which has the effect of multiplying the QPSK symbol by −1. Further, an Alamouti pair of two consecutive QPSK symbols is multiplied by [1, −1]. Thus, when BS 110-1 applies scrambling sequences C to subsets of bits, BS 110-1 performs a transformation implemented as a scrambling sequence at the bit level that may equivalent to a phase rotation of QPSK symbols (e.g., a 0 degree or 180 degree phase rotation) at a symbol level. This, may permit UE 120-1 to perform symbol level combining to de-scramble the first NB-PBCH, thus permitting UE 120-1 to perform descrambling with a reduced utilization of processing resources relative to performing bit level combining.

In some aspects, BS 110-1 may apply another differentiator during the second processing stage. For example, BS 110-1 may apply an offset of mapped resource elements based at least in part on the cell identity of BS 110-1. In this case, when mapping QPSK symbols to resource elements, each BS 110 may begin the mapping at a different subframe (e.g., BS 110-1 may begin the mapping at an offset of 3 resource elements, BS 110-1 may begin the mapping at an offset of 1 resource element, etc.). In this case, BS 110-2 may begin the mapping at an offset of another quantity of resource elements, which may result in reduced inter-cell interference. In this way, BSs 110 may provide inter-cell randomization to compensate for inter-cell interference.

At 520, BSs 110 may transmit respective NB-PBCHs. For example, BS 110-1 may transmit a first NB-PBCH that is intended for UE 120-1, and may be an interfering transmission for UE 120-2. Similarly, BS 110-2 may transmit a second NB-PBCH that is intended for UE 120-2, and may be an interfering transmission for UE 120-1. In some aspects, BSs 110 may transmit respective cell identifiers identifying respective cell identities before transmitting the respective NB-PBCHs. For example, BSs 110 may transmit respective PSSs or SSSs based at least in part on which UEs 120 may determine respective cell identities for the respective BSs 110. In some aspects, BSs 110 may transmit the respective cell identifiers concurrent with transmitting the respective NB-PBCHs. For example, BS 110-1 may transmit a transmission that includes a cell identifier identifying a cell identity of BS 110-1 and that includes an NB-PBCH.

At 530, UEs 120 may receive the respective NB-PBCHs. For example, UE 120-1 may receive the first NB-PBCH from BS 110-1, and may receive interfering transmissions from one or more other cells, such as the second NB-PBCH from BS 110-2. Similarly, UE 120-2 may receive the second NB-PBCH from BS 110-2, and may receive interfering transmissions from one or more other cells, such as the first NB-PBCH from BS 110-1. In some aspects, based at least in part on the scrambling sequences applied to the respective NB-PBCHs or another differentiator in the respective NB-PBCHs, interference associated with the interfering transmissions may be less than a threshold value. In some aspects, UEs 120 may receive cell identifiers from respective BSs 110 before receiving the respective NB-PBCHs. For example, UE 120-1 may receive a PSS or an SSS that includes information identifying a cell identity for a cell from which UE 120-1 is to receive an NB-PBCH. In some aspects, UEs 120 may receive the respective cell identifiers concurrent with receiving the respective NB-PBCHs. For example, UE 120-1 may receive a transmission from BS 110-1 that includes a cell identifier and that includes an NB-PBCH.

At 540, UEs 120 may perform de-scrambling of the respective NB-PBCHs using the respective cell identifiers. For example, based at least in part on information identifying block boundaries between each block (e.g., based at least in part on stored information indicating a block boundary at 80 ms) and based at least in part on each block using the same set of scrambling sequences $C_{0,7}$, UE 120-1 may determine log-likelihood-ratios (LLRs) for a group of 200 bits in 8 consecutive subframes, which may result in storing and processing 1600 LLRs, and may perform combining across different blocks of the first NB-PBCH to reverse the second processing stage to recover the NB-PBCH. Further to the example, UE 120-1 may reverse the first processing stage using a hypothesis testing procedure to recover the NB-PBCH. Thus, UE 120-1 requires a reduced utilization of memory and processing resources relative to another proposed technique for scrambling which does not repeat scrambling sequences $C_{0,7}$ for each block. For example, it has been proposed that each block use a different scrambling sequence (e.g., $C_{0,7}$ for the first block, $C_{8,15}$ for the second block, etc.), which may result in 1600*M LLRs for a quantity of M blocks, thereby causing substantially greater utilization of processing resources and/or memory resources by UEs 120.

As indicated above, FIG. 5 is provided as an example. Other examples are possible and may differ from what was described with respect to FIG. 5.

Figure 6:
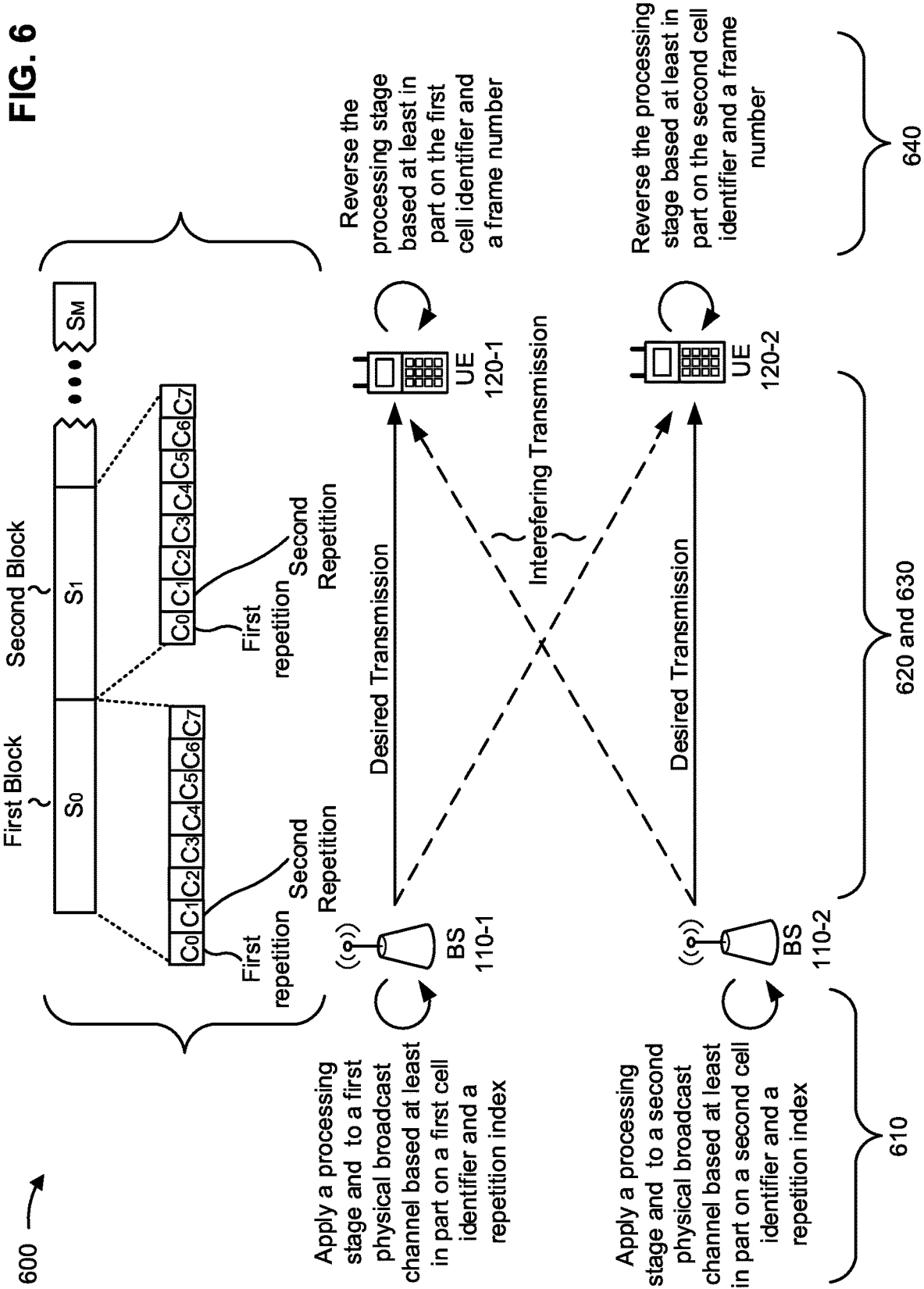
FIG. 6 is a diagram illustrating an example of a BS, in an interference-limited scenario with synchronous cells, transmitting a physical broadcast channel and a UE receiving the physical broadcast channel.

FIG. 6 is a diagram illustrating an example 600 of a BS, in an interference-limited scenario with synchronous cells, transmitting an NB-PBCH and a UE receiving the NB-PBCH. As shown in FIG. 6, example 600 may include BSs 110-1 and 110-2 (collectively referred to as BSs 110 and generally referred to as BS 110) and UEs 120-1 and 120-2 (collectively referred to as UEs 120 and generally referred to as UE 120).

At 610, BSs 110 may apply, respectively, a processing stage to repetitions of repeating subsets of symbols of each block of the respective NB-PBCHs. In the processing stage, a set of scrambling sequences, $S=\{S_0, S_1, \ldots, S_7\}$, may be applied to each repetition of repeating subsets of symbols of a block. For example, BS 110-1 may apply a scrambling or rotation sequence $S_0$ to a first repetition of a repeating subset of symbols of the first block, a scrambling or rotation sequence $S_1$ to a second repetition of the repeating subset of symbols of the first block, etc. Similarly, BS 110-1 may apply the same scrambling or rotation sequence $S_0$ to a corresponding first repetition of a repeating subset of symbols of the second block, the same scrambling or rotation sequence $S_1$ to a corresponding second repetition of the repeating subset of symbols of the second block, etc. In this case, the set of scrambling or rotation sequences provides inter-cell interference randomization to compensate for interference between, for example, BS 110-1 and BS 110-2 based at least in part on BS 110-2 applying a different set of scrambling or rotation sequences, S. Based at least in part on using the same scrambling or rotation sequence S for each block of the first NB-PBCH, BS 110-1 enables UE 120 to reverse the processing stage with a reduced utilization of computing resources relative to using different scrambling sequences for each block.

In some aspects, the sequence of scrambling or rotation sequences may be generated based at least in part on a cell identifier (cell ID) and/or a timing indication (e.g. frame number). For example, the set of sequences used by cell c1 (e.g., BS 110-1), $S_{c1}=\{S_{0,c1}, S_{1,c1}, \ldots, S_{7,c1}\}$, may be obtained by generating a first binary sequence (e.g., a pseudo-random binary sequence, a binary generator generated binary sequence, a deterministic binary sequence, and/or the like) for each of the scrambling or rotation sequence $S_{i,j}$ (e.g., by using a Gold code) that can be mapped to a complex scrambling or rotation sequence. In some aspects, the binary sequence may be generated based at least in part on a binary generator, which may be a pseudo-random bit generator initialized based on a particular value. In some aspects, the pseudo-random bit generator may be a linear-feedback shift register (LFSR) based bit generator wherein an initial state of the LFSR is based at least in part on the particular value. For a pseudo-random binary sequence $c_{i,j}$ of length 2W, the corresponding scrambling or rotation sequence $S_{i,j}$ may be of length W. For example, the scrambling or rotation sequence can be obtained from the pseudo-random binary sequence as $$S_{i,j}(n) = \begin{cases} 1, & \text{if } c_{i,j}(2n) = 0 \text{ and } c_{i,j}(2n+1) = 0 \\ -1, & \text{if } c_{i,j}(2n) = 0 \text{ and } c_{i,j}(2n+1) = 1 \\ 1j, & \text{if } c_{i,j}(2n) = 1 \text{ and } c_{i,j}(2n+1) = 0 \\ -1j, & \text{if } c_{i,j}(2n) = 1 \text{ and } c_{i,j}(2n+1) = 1 \end{cases}$$

where 1j denotes the imaginary unit.

Generating a set of pseudo-random sequence $c_{i,j}$ may be based at least in part on an initialization value. In some cases (e.g., for Gold codes), the pseudo-random sequence may be an affine function of the initialization value. In other words, the pseudo-random sequence may be based at least in part on a combination of a linear term and a constant term, in such a way that $c_{i,j} = L\ I_{i,j} + X$, where L is a generator binary matrix that depends on the generating polynomial of the pseudo-random sequence, $I_{i,j}$ is a binary vector containing the initialization value of the pseudo-random sequence for the i-th repetition of the repeating subset of symbols associated with cell j, and X is a constant binary vector. The initialization of the pseudo-random sequence may be selected based at least in part on a non-linear combination of the cell ID j and the repetition index i. In contrast, selecting initializations that are linear functions of i and j may lead to a cross-correlation property, such as $C_{i1,j1} + C_{i1,j2} = C_{i2,j1} + C_{i2,j2}$. In one example, $I_{i,j} = j + 2^9 (i+1)^3 *(j+1)$. The term $2^9 (i+1)^3 *(j+1)$ introduces a non-linear dependency that may improve the cross-correlation properties of the sequences.

In some aspects, for an NB-PBCH, a block of complex-valued symbols $y^{(p)}(0), \ldots, y^{(p)}(M_{symb}-1)$ is to be transmitted in subframe 0 during 64 consecutive radio frames, where $M_{symb} = 800$ for a normal cyclic prefix. The block of complex-valued symbols may be transmitted at a first radio frame that satisfies $n_f \bmod 64 = 0$. In this case, $n_f$ denotes an index of a radio frame and $M_{symb}$ denotes a quantity of symbols. A block of complex-valued symbols to be transmitted in subframe 0 of radio frame $f = n_f$ is denoted as $y^{(p)}(0), \ldots, y^{(p)}(K-1)$, where $y^{(p)}(i) = \theta_f(i) y^{(p)}(K \lfloor f/8 \rfloor + i)$, for $i = 0, \ldots, 99$. In this case, $K = 100$ for a normal cyclic prefix, and a phase rotation is applied based at least in part on:

$$\theta_f(i) = \begin{cases} 1, & \text{if } c_f(2i) = 0 \text{ and } c_f(2i+1) = 0 \\ -1, & \text{if } c_f(2i) = 0 \text{ and } c_f(2i+1) = 1 \\ j, & \text{if } c_f(2i) = 1 \text{ and } c_f(2i+1) = 0 \\ -j, & \text{if } c_f(2i) = 1 \text{ and } c_f(2i+1) = 1 \end{cases}$$

In some aspects, for an NB-PBCH, a scrambling sequence $c_f(j)$, for $j = 0, \ldots, 199$ is initialized at the start of each radio frame based at least in part on an equation $c_{init} = +(N_{ID}^{Ncell} + 1)(n_f \bmod 8 + 1)^3 \cdot 2^9 + N_{ID}^{Ncell}$, where $N^{Ncell}_{ID}$ denotes an identifier of a cell. The block of complex-valued symbols is mapped, starting at $y^{(p)}_f(0)$ to resource elements (k, l).

In some aspects, for a system information block (SIB) of a downlink shared channel (e.g., a narrowband physical downlink shared channel (NB-PDSCH or NPDSCH)) carrying a broadcast control channel (BCCH), a scrambling sequence may be generated using a scrambling sequence generator initialized based at least in part on an equation $c_{init} = n_{RNTI} \cdot 2^{15} + (N_{ID}^{Ncell} + 1)((n_f \bmod 61) + 1)$, an equation $c_{init} = n_{RNTI} \cdot 2^{14} + n_f \bmod 2 \cdot 2^{13} + \lfloor n_s/2 \rfloor \cdot 2^9 + N_{ID}^{Ncell}$, and/or the like, where $n_s$ denotes a first slot of a transmission of a codeword. In this case, the scrambling sequence generator may be reinitialized for each NB-PDSCH repetition, after each set of a plurality of NB-PDSCH repetitions, and/or the like.

At 620, BSs 110 may transmit respective NB-PBCHs. For example, BS 110-1 may transmit a first NB-PBCH that is intended for UE 120-1, and may be an interfering transmission for UE 120-2. Similarly, BS 110-2 may transmit a second NB-PBCH that is intended for UE 120-2, and may be an interfering transmission for UE 120-1. In some aspects, BSs 110 may transmit respective cell identifiers identifying respective cell identities before transmitting the respective NB-PBCHs. For example, BSs 110 may transmit respective PSSs or SSSs based at least in part on which UEs 120 may determine respective cell identities for the respective BSs 110. In some aspects, BSs 110 may transmit the respective cell identifiers concurrently with transmitting the respective NB-PBCHs. For example, BS 110-1 may transmit a transmission that includes a cell identifier identifying a cell identity of BS 110-1 and that includes an NB-PBCH.

At 630, UEs 120 may receive the respective NB-PBCHs. For example, UE 120-1 may receive the first NB-PBCH from BS 110-1, and may receive interfering transmissions from one or more other cells, such as the second NB-PBCH from BS 110-2. Similarly, UE 120-2 may receive the second NB-PBCH from BS 110-2, and may receive interfering transmissions from one or more other cells, such as the first NB-PBCH from BS 110-1. In some aspects, based at least in part on the scrambling or rotation sequences applied to the respective NB-PBCHs or another differentiator in the respective NB-PBCHs, interference associated with the interfering transmissions may be less than a threshold value and/or randomized. In some aspects, UEs 120 may receive cell identifiers from respective BSs 110 before receiving the respective NB-PBCHs. For example, UE 120-1 may receive a PSS or an SSS that includes information identifying a cell identity for a cell from which UE 120-1 is to receive an NB-PBCH. In some aspects, UEs 120 may receive the respective cell identifiers concurrent with receiving the respective NB-PBCHs. For example, UE 120-1 may receive a transmission from BS 110-1 that includes a cell identifier and that includes an NB-PBCH.

At 640, UEs 120 may perform de-scrambling or de-rotating of the respective NB-PBCHs using the respective cell identifiers.

As indicated above, FIG. 6 is provided as an example. Other examples are possible and may differ from what was described with respect to FIG. 6

Figure 7:
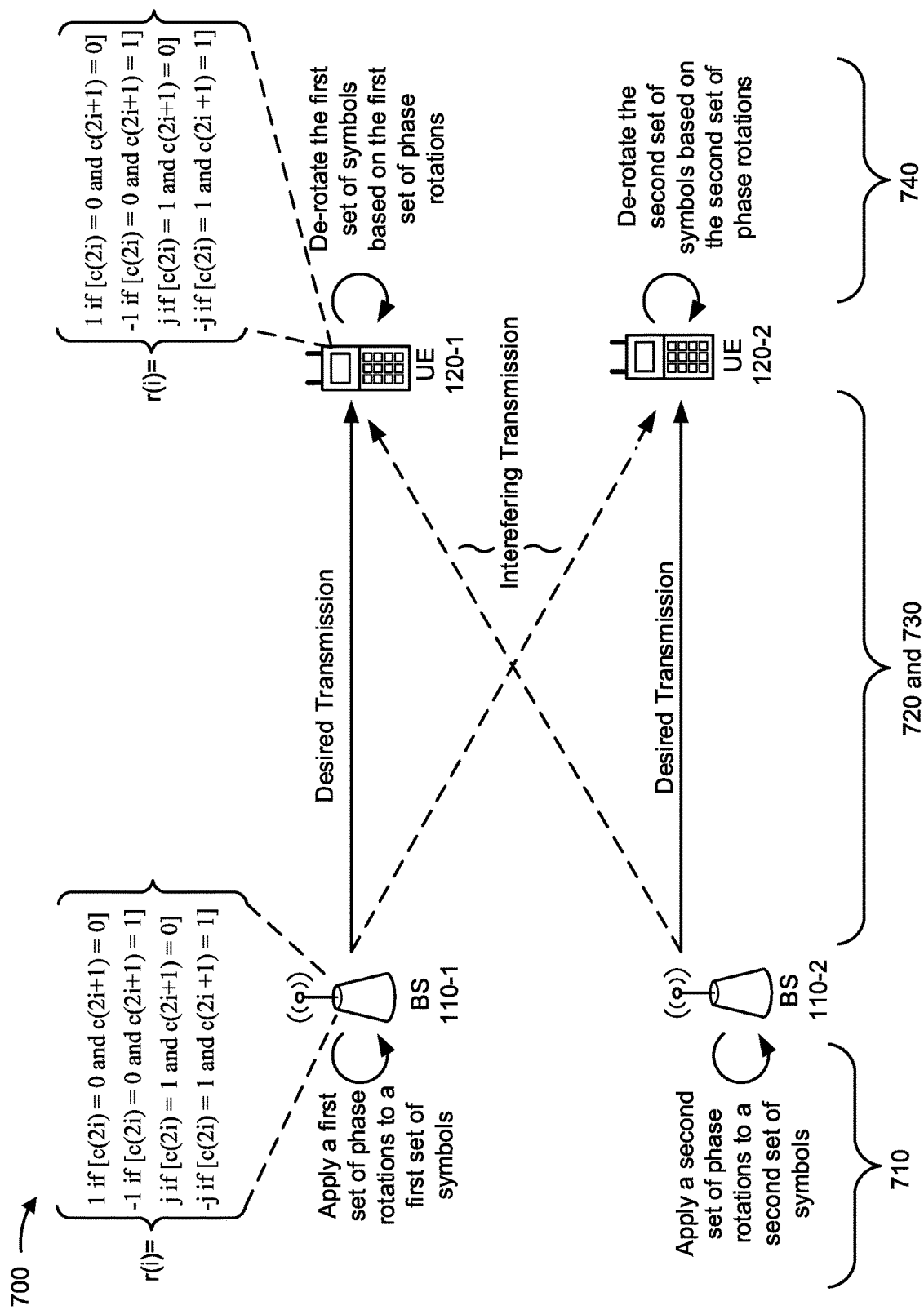
FIG. 7 is a diagram illustrating an example of a BS, in an interference-limited scenario with synchronous cells, transmitting a physical broadcast channel, which includes a set of phase-rotated symbols, and a UE receiving the physical broadcast channel.

FIG. 7 is a diagram illustrating an example 700 of a BS, in an interference-limited scenario with synchronous cells, transmitting an NB-PBCH including a set of phase-rotated symbols and a UE receiving the NB-PBCH. As shown in FIG. 7, example 1300 may include BSs 110-1 and 110-2 (collectively referred to as BSs 110 and generally referred to as BS 110) and UEs 120-1 and 120-2 (collectively referred to as UEs 120 and generally referred to as UE 120).

At 710, BSs 110 may apply, respectively, a first set of phase rotations to a first set of symbols and a second set of phase rotations to a second set of symbols, where the first set of phase rotations is different from the send set of phase rotations. For example, BS 110-1 may apply the first set of phase rotations based at least in part on a cell identity associated with base station 110-1. In some aspects, the symbols may be modulated IQ symbols (e.g., QPSK symbols). For example, after modulating a symbol, BS 110-1 may apply a phase rotation to the symbol.

In some aspects, BSs 110 may apply phase rotations based at least in part on a scrambling sequence of a respective NB-PBCH. For example, BS 110-1 may apply phase rotations:

$$r(i) = \begin{cases} 1: & c(2i) = 0 \text{ AND } c(2i+1) = 0 \\ -1: & c(2i) = 0 \text{ AND } c(2i+1) = 1 \\ j: & c(2i) = 1 \text{ AND } c(2i+1) = 0 \\ -j: & c(2i) = 1 \text{ AND } c(2i+1) = 1 \end{cases}$$

where r(i) represents a phase rotation applied to each resource element i inside a set of repeated OFDM symbols using the same scrambling sequence, c(i) represents a value at position i in a sequence of length 2M, and M represents a quantity of resource elements in a subframe. In this case, BS 110-1 may apply the first set of phase rotations based at least in part on a first cell identity associated with BS 110-1 and the scrambling sequence and BS 110-2 may apply the second set of phase rotations based at least in part on a second cell identity associated with BS 110-2 and the scrambling sequence. In this way, transmissions of respective NB-PBCHs from BS 110-1 and BS 110-2 are associated with different phase rotations, which may enable UEs 120 to identify symbols included in the respective NB-PBCHs. Additionally, or alternatively, BSs 110 may apply phase rotations based at least in part on an orthogonal or quasi-orthogonal sequence. For example, a BS 110 may select a quasi-orthogonal sequence from a set of quasi-orthogonal sequences based at least in part on a cell identity, and may use the quasi-orthogonal sequence to determine a phase rotation to apply to a symbol.

In some aspects, BSs 110 may apply different phase rotations to each resource element of an OFDM symbol. For example, BS 110-1 may apply a set of phase rotations to a set of resource elements in an OFDM symbol. In some aspects, BSs 110 may apply different phase rotations to each OFDM symbol of a subframe. For example, BS 110-1 may apply a first phase rotation to each resource element in a first OFDM symbol, and may apply a second phase rotation to each resource element in a second OFDM symbol. In some aspects, BSs 110 may apply different phase rotations to each subframe. For example, BS 110-1 may apply a first phase rotation to each resource element of each OFDM symbol in a first subframe, and may apply a second phase rotation to each resource element of each OFDM symbol in a second subframe.

In another example, BSs 110 may apply another differentiator to an NB-PBCH to compensate for and/or reduce interference. For example, BSs 110 may offset transmission frequencies of respective NB-PBCH transmissions. In this case, BS 110-1 may transmit an NB-PBCH at a first frequency and BS 110-2 may transmit an NB-PBCH at a second frequency that is offset from the first frequency by a threshold amount. Additionally, or alternatively, BSs 110 may offset subframes of respective NB-PBCH transmissions. In this case, BS 110-1 and BS 110-2 may apply relative subframe delays of respective quantities of subframes based at least in part on respective physical cell identities.

At 720, BSs 110 may transmit respective NB-PBCHs. For example, BS 110-1 may transmit a first NB-PBCH that is intended for UE 120-1, and may be an interfering transmission for UE 120-2. Similarly, BS 110-2 may transmit a second NB-PBCH that is intended for UE 120-2, and may be an interfering transmission for UE 120-1. In some aspects, BSs 110 may transmit respective cell identifiers identifying respective cell identities before transmitting the respective NB-PBCHs. For example, BSs 110 may transmit respective PSSs or SSSs based at least in part on which UEs 120 may determine respective cell identities for the respective BSs 110. In some aspects, BSs 110 may transmit the respective cell identifiers concurrent with transmitting the respective NB-PBCHs. For example, BS 110-1 may transmit a transmission that includes a cell identifier identifying a cell identity of BS 110-1 and that includes an NB-PBCH.

At 730, UEs 120 may receive the respective NB-PBCHs. For example, UE 120-1 may receive the first NB-PBCH from BS 110-1, and may receive interfering transmissions from one or more other cells, such as the second NB-PBCH from BS 110-2. Similarly, UE 120-2 may receive the second NB-PBCH from BS 110-2, and may receive interfering transmissions from one or more other cells, such as the first NB-PBCH from BS 110-1. In some aspects, based at least in part on the phase rotation or another differentiator in the respective NB-PBCHs, interference associated with the interfering transmissions may be less than a threshold value. In some aspects, UEs 120 may receive cell identifiers from respective BSs 110 before receiving the respective NB-PBCHs. For example, UE 120-1 may receive a PSS or an SSS that includes information identifying a cell identity for a cell from which UE 120-1 is to receive an NB-PBCH. In some aspects, UEs 120 may receive the respective cell identifiers concurrent with receiving the respective NB-PBCHs. For example, UE 120-1 may receive a transmission from BS 110-1 that includes a cell identifier and that includes an NB-PBCH.

At 740, UEs 120 may de-rotate symbols of the respective NB-PBCHs. For example, UE 120-1 may de-rotate the first set of symbols based at least in part on the first set of phase rotations applied by BS 110-1. In this case, based at least in part on receiving phase-rotated symbols to compensate for interference, UEs 120 may perform averaging to determine the phase-rotated symbols of the desired NB-PBCH. In some aspects, UE 120 may de-rotate the phase-rotated symbols based at least in part on the cell identity. For example, UE 120-1 may determine a set of phase rotations that were applied to the set of symbols by BS 110-1 based at least in part on the cell identity, and may de-rotate the set of symbols based at least in part on the set of phase rotations. In this case, UEs 120 may demodulate the set of symbols after de-rotating the set of symbols to determine information conveyed by the set of symbols.

As indicated above, FIG. 7 is provided as an example. Other examples are possible and may differ from what was described with respect to FIG. 7.

FIG. 8 is a flow chart of a method 800 of wireless communication. The method 800 may be performed by a BS (e.g., which may correspond to one or more of BS 110, such as BSs 110-1 and/or 110-2, the apparatus 1202/1202', base station 1850, and/or the like).

At 810, in some aspects, the BS applies a set of processing stages to bits of a physical broadcast channel (block 810). For example, the BS may apply a first processing stage, such as a first set of scrambling sequences, to blocks of bits of the physical broadcast channel. Additionally, or alternatively, the BS may apply a second processing stage, such as a second set of scrambling sequences, to repetitions of repeating subsets of bits of the physical broadcast channel. In some aspects, the BS may cause a phase rotation to be applied to bits of the physical broadcast channel, such as based at least in part on using quadruplets of bits for a scrambling sequence. In some aspects, the BS may apply an offset to a mapping of resource elements of the physical broadcast channel. In some aspects, the BS may apply the set of processing stages to each bit before transmitting the physical broadcast channel. In some aspects, the BS may apply one or more processing stages to first bits of the physical broadcast channel, may transmit the first bits, and may subsequently apply the one or more processing stages to second bits of the physical broadcast channel, and may transmit the second bits.

At 820, the BS transmits a cell identifier for a cell (block 820). For example, the BS may transmit the cell identifier to a UE before transmitting a physical broadcast channel, such as an NB-PBCH. In some aspects, the BS may transmit a PSS or an SSS, as described in more detail herein, which may indicate a cell identifier, such as a cell identity (cell ID or OD), that identifies a cell. Additionally, or alternatively, the BS may transmit the cell identifier concurrent with transmitting the physical broadcast channel. In some aspects, the BS may transmit the cell identifier before applying the set of processing stages to bits of the physical broadcast channel. For example, the BS may transmit the cell identifier for the cell to the UE, and may subsequently process bits of the physical broadcast channel based at least in part the set of processing stages.

At 830, the BS transmits a physical broadcast channel (block 830). For example, the BS may transmit the physical broadcast channel, which includes a plurality of blocks. In some aspects, each block, of the plurality of blocks, includes repeating subsets of bits. In some aspects, each block, of the plurality of blocks, is processed using a first processing stage. In some aspects, each repetition of the repeating subsets of bits, for each block, is processed using a second processing stage such that a particular repetition of the repeating subset of bits of a first block and a corresponding particular repetition of the repeating subset of bits of a second block are processed using a common processing scheme. In some aspects, the first processing stage and the second processing stage are each initialized based at least in part on the cell identifier.

In some aspects, the first block and the second block are scrambled using different scrambling sequences during the first processing stage. In some aspects, the different scrambling sequences during the first processing stage are based at least in part on a system frame number.

In some aspects, each repetition of the repeating subset of bits of the first block is scrambled using a respective one of a plurality of scrambling sequences during the second processing stage, each repetition of the repeating subset of bits of the second block is scrambled using a respective one of the plurality of scrambling sequences during the second processing stage, and the particular repetition of the repeating subset of bits of the first block and the corresponding particular repetition of the repeating subset of bits of the second block are scrambled using a same scrambling sequence, of the plurality of scrambling sequences, during the second processing stage. In some aspects, the plurality of scrambling sequences provide inter-cell interference randomization. In some aspects, each scrambling sequence, of the plurality of scrambling sequences, comprises a group of bits having a common value.

In some aspects, the repeating subsets of bits are modulated into symbols and the symbols are phase rotated during the second processing stage. In some aspects, first bits, of the particular repetition of the repeating subset of bits of the first block, are phase rotated using a first phase rotation, second bits, of the particular repetition of the repeating subset of bits of the first block, are phase rotated using a second phase rotation, and the second phase rotation is different from the first phase rotation. In this case, the first bits and the second bits may be scrambled using a scrambling sequence such that the first phase rotation and the second phase rotation are effectively caused, respectively, by the scrambling. In some aspects, the repeating subsets of bits are offset based at least in part on an offset sequence during the second processing stage.

In some aspects, the physical broadcast channel includes a plurality of blocks, each block, of the plurality of blocks, includes repeating subsets of symbols, each repetition of the repeating subsets of symbols, for each block, is processed using a processing stage such that a particular repetition of the repeating subsets of symbols of a first block and a corresponding particular repetition of the repeating subsets of symbols of a second block are processed using a common processing scheme, and the processing stage is initialized based at least in part on the cell identifier and a repetition index.

In some aspects, a binary sequence is generated for each repetition index during the processing stage, scrambling sequences or rotation sequences are generated based at least in part on the binary sequences during the processing stage, and repetitions of the repeating subsets of symbols are scrambled based at least in part on the scrambling sequences or rotated based at least in part on the rotation sequences during the processing stage. In some aspects, the binary sequence is obtained based at least in part on a pseudo-random binary generator, and the pseudo-random binary generator is initialized based at least in part on the cell identifier and the repetition index. In some aspects, the pseudo-random binary generator is initialized based at least in part on a binary vector associated with a non-linear combination of the cell identifier and the repetition index. In some aspects, the repetition index is based at least in part on a radio frame number.

Although FIG. 8 shows example blocks of a method of wireless communication, in some aspects, the method may include additional blocks, fewer blocks, different blocks, or differently arranged blocks than those shown in FIG. 8. Additionally, or alternatively, two or more blocks shown in FIG. 8 may be performed in parallel.

FIG. 9 is a flow chart of a method 900 of wireless communication. The method 900 may be performed by a BS (e.g., which may correspond to one or more of BS 110, such as BSs 110-1 and/or 110-2, the apparatus 1202/1202', base station 1850, and/or the like).

At 910, the BS transmits a cell identifier for a cell (block 910). For example, the BS may transmit the cell identifier to a UE before transmitting the physical broadcast channel, such as an NB-PBCH. In some aspects, the BS may transmit a PSS or an SSS, as described in more detail herein, which may indicate a cell identifier, such as a cell identity (cell ID or OD), that identifies a cell. Additionally, or alternatively, the BS may transmit the cell identifier concurrent with transmitting the physical broadcast channel.

At 920, the BS transmits a physical broadcast channel (block 920). For example, the BS may transmit the physical broadcast channel, which may include a plurality of sets of symbols, to the UE. In some aspects, each set of symbols, of the plurality of sets of symbols, is scrambled with a respective scrambling sequence of a plurality of scrambling sequences. In some aspects, each set of symbols, of the plurality of sets of symbols, is associated with at least one phase rotation. In some aspects, the at least one phase rotation is based at least in part on the cell identifier for the cell.

In some aspects, each symbol, of a set of symbols of the plurality of sets of symbols, is associated with a same scrambling sequence of the plurality of scrambling sequences. In some aspects, the plurality of sets of symbols are modulated IQ symbols. In some aspects, the plurality of sets of symbols are quadrature phase-shift keying (QPSK) symbols. In some aspects, each cell, of a set of cells that includes the cell, is associated with a different set of phase rotations.

In some aspects, the at least one phase rotation is a plurality of phase rotations. For example, the plurality of phase rotations may be a sequence of phase rotations, or be the result of a formula for determining a plurality of phase rotations based at least in part on a symbol, set or subframe indices. In some aspects, the at least one phase rotation is one phase rotation. In some aspects, the at least one phase rotation is determined based at least in part on a scrambling sequence of the plurality of scrambling sequences. In some aspects, the at least one phase rotation is determined based at least in part on a set of orthogonal or quasi-orthogonal sequences.

Although FIG. 9 shows example blocks of a method of wireless communication, in some aspects, the method may include additional blocks, fewer blocks, different blocks, or differently arranged blocks than those shown in FIG. 9. Additionally, or alternatively, two or more blocks shown in FIG. 9 may be performed in parallel.

FIG. 10 is a flow chart of a method 1000 of wireless communication. The method 1000 may be performed by a BS (e.g., which may correspond to one or more of BS 110, such as BSs 110-1 and/or 110-2, the apparatus 1202/1202', base station 1850, and/or the like).

At 1010, in some aspects, the BS scrambles blocks of a channel (block 1010). For example, the BS may determine scrambling sequences for each block of a narrowband physical broadcast channel, and may scramble each block of the narrowband physical broadcast channel to reduce channel interference for the narrowband physical broadcast channel. In some aspects, each block, of the plurality of blocks, is scrambled using a scrambling sequence, of a plurality of scrambling sequences, initialized based at least in part on a block index of the block and a cell identifier for a cell.

At 1020, in some aspects, the BS rotates sets of symbols of the channel (block 1020). For example, the BS may determine rotation sequences for each repetition of a set of symbols in a block of the narrowband physical broadcast channel, and may phase rotate each block of the narrowband physical broadcast channel to reduce channel interference for the narrowband physical broadcast channel. In some aspects, each block, of a plurality of blocks of the channel, includes repetitions of sets of symbols. In some aspects, each repetition, of the repetitions of sets of symbols, for each block, is rotated using a different rotation sequence, of a plurality of rotation sequences, initialized based at least in part on a repetition index of the repetition. In some aspects, a repetition may be initialized based at least in part on some combination of at least the repetition index and a cell identifier, such as a non-linear combination, a linear combination, and/or the like.

At 1030, the BS transmits the channel (block 1030). For example, the BS may transmit a narrowband physical broadcast channel based at least in part on scrambling blocks of the narrowband physical broadcast channel and phase rotating repetitions of sets of symbols of the narrowband physical broadcast channel, thereby enabling a UE to recover data of the physical broadcast channel.

In some aspects, a plurality of phase rotations are applied to the repetitions of sets of symbols based at least in part on the equation:

$$\theta_f(i) = \begin{cases} 1, & \text{if } c_f(2i) = 0 \text{ and } c_f(2i+1) = 0 \\ -1, & \text{if } c_f(2i) = 0 \text{ and } c_f(2i+1) = 1 \\ j, & \text{if } c_f(2i) = 1 \text{ and } c_f(2i+1) = 0 \\ -j, & \text{if } c_f(2i) = 1 \text{ and } c_f(2i+1) = 1 \end{cases}.$$

In some aspects, the plurality of scrambling sequences are initialized based at least in part on the equation:

$$c_{init} = +(N_{ID}^{Ncell}+1)(n_f \bmod 8+1)^3 \cdot 2^9 + N_{ID}^{Ncell}.$$

In some aspects, the channel is a physical broadcast channel. In some aspects, the repetition index is based at least in part on a radio frame number. In some aspects, a binary sequence, of a plurality of binary sequences, is generated for each repetition index associated with the repetitions of sets of symbols, and the plurality of rotation sequences are generated based at least in part on the plurality of binary sequences.

In some aspects, the plurality of binary sequences are obtained based at least in part on a pseudo-random binary generator, and the pseudo-random binary generator is initialized, for each binary sequence, of the plurality of binary sequences, based at least in part on a corresponding cell identifier and a corresponding repetition index. In some aspects, the plurality of binary sequences are obtained based at least in part on a pseudo-random binary generator, and the pseudo-random binary generator is initialized, for each binary sequence, of the plurality of binary sequences, based at least in part on a binary vector associated with a non-linear combination of a corresponding cell identifier and a corresponding repetition index.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

FIG. 11 is a flow chart of a method 1100 of wireless communication. The method 1100 may be performed by a BS (e.g., which may correspond to one or more of BS 110, such as BSs 110-1 and/or 110-2, the apparatus 1202/1202', base station 1850, and/or the like).

At 1110, in some aspects, the BS determines a scrambling sequence (block 1110). For example, the BS may determine the scrambling sequence for repetitions of a set of bits of a channel, such as based at least in part on a scrambling sequence generator output.

At 1120, in some aspects, the BS scrambles a repetition of a set of bits of a channel using the scrambling sequence (block 1120). For example, the BS may scramble each repetition of a plurality of repetitions of a set of bits of a channel using a different scrambling sequence of a plurality of different scrambling sequences.

At 1130, the BS transmits the channel (block 1130). For example, the BS may transmit a channel to a UE to convey information to the UE. In some aspects, each scrambling sequence, of the plurality of different scrambling sequences, includes a plurality of tuples of bits, and each repetition is scrambled based at least in part on a tuple of bits, of the plurality of tuples of bits, associated with a corresponding scrambling sequence, of the plurality of different scrambling sequences. In some aspects, the channel conveys a system information block-type 1 (SIB1).

In some aspects, each binary sequence, of a plurality of binary sequences, is obtained based at least in part on a pseudo-random binary generator, the pseudo-random binary generator is initialized based at least in part on the cell identifier and the repetition index, and the plurality of scrambling sequences are obtained based at least in part on a corresponding binary sequence of the plurality of binary sequences. In some aspects, the pseudo-random binary generator is initialized based at least in part on a binary vector associated with a non-linear combination of the cell identifier and the repetition index.

In some aspects, the repetition index is based at least in part on a radio frame number. In some aspects, the plurality of scrambling sequences are determined based at least in part on a Gold code. In some aspects, the channel is a physical shared channel.

In some aspects, the plurality of different scrambling sequences are based at least in part on an equation:

$$c_{init}=n_{RNTI}\cdot 2^{15}+(N_{ID}^{Ncell}+1)((n_f \bmod 61)+1).$$

In some aspects, the plurality of different scrambling sequences are based at least in part on an equation:

$$c_{init}=n_{RNTI}\cdot 2^{14}+n_f \bmod 2\cdot 2^{13}+\lfloor n_s/2 \rfloor\cdot 2^9+N_{ID}^{Ncell}.$$

Although FIG. 11 shows example blocks of a method of wireless communication, in some aspects, the method may include additional blocks, fewer blocks, different blocks, or differently arranged blocks than those shown in FIG. 11. Additionally, or alternatively, two or more blocks shown in FIG. 11 may be performed in parallel.

Figure 12:
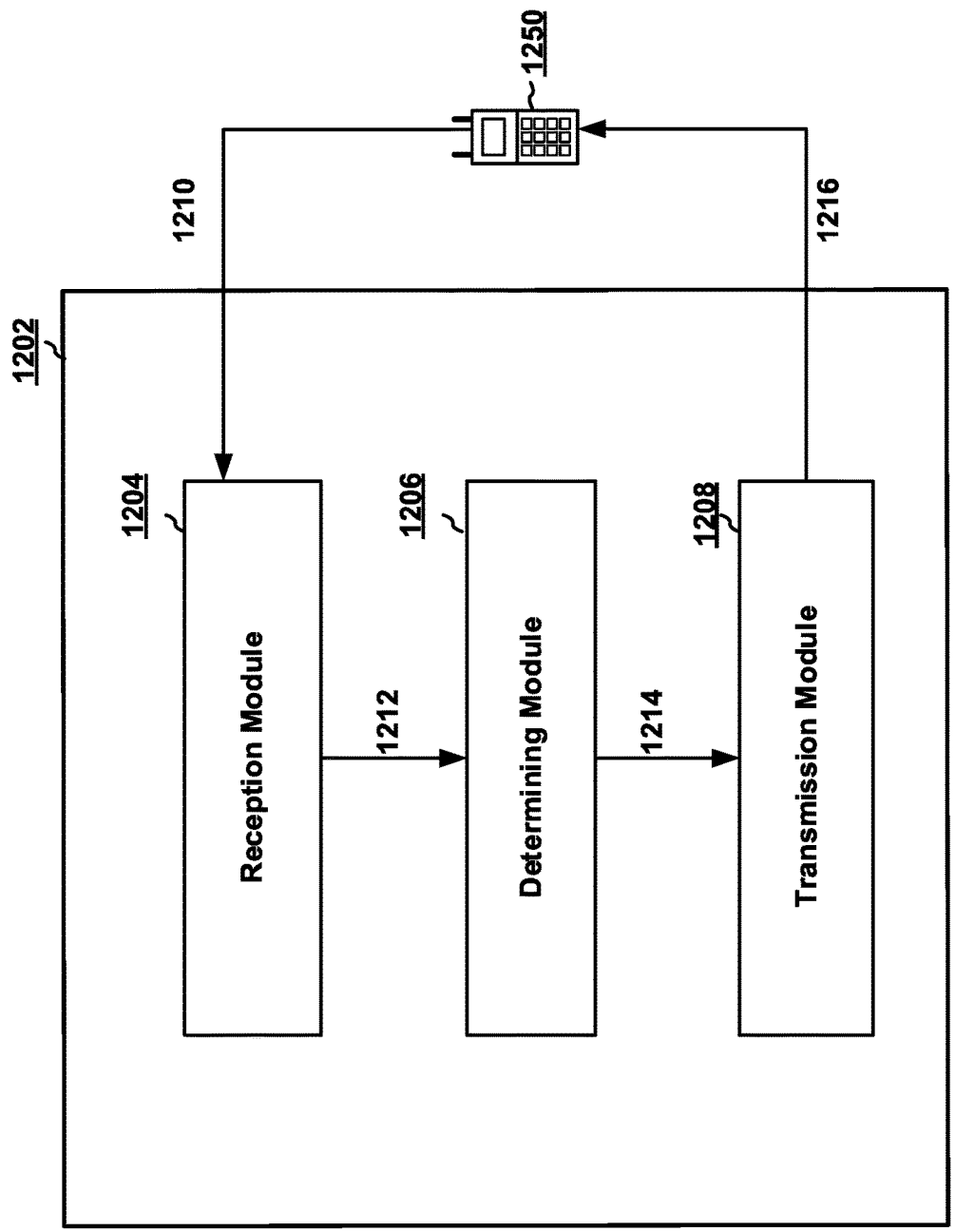
FIG. 12 is a conceptual data flow diagram illustrating the data flow between different modules/means/components in an example apparatus.

FIG. 12 is a conceptual data flow diagram 1200 illustrating the data flow between different modules/means/components in an example apparatus 1202. The apparatus 1202 may be a BS. In some aspects, the apparatus 1202 includes a reception module 1204, a determining module 1206, and/or a transmission module 1208.

The reception module 1204 may receive, from a user equipment 1250 and as data 1210, one or more signaling messages. For example, the reception module 1204 may receive information associated with synchronizing the user equipment 1250 with the apparatus 1202 to permit the apparatus 1202 to transmit a physical broadcast channel (e.g., an NB-PBCH). In some aspects, the reception module 1204 may receive control information associated with determining a set of scrambling sequences to apply to bits of the physical broadcast channel, an offset to apply to a mapping of modulation symbols to resource elements of subframes of the physical broadcast channel, and/or the like, such as from a network controller, as described herein. In some aspects, the reception module 1204 may receive control information associated with determining a set of phase rotations to apply to a set of symbols, such as from a network controller, as described herein.

In some aspects, the determining module 1206 may receive, from the reception module 1204 and as data 1212, information associated with determining a set of scrambling sequences to apply to bits of a physical broadcast channel, an offset sequence for mapping modulation symbols (e.g., QPSK symbols) to resource elements of subframes of the physical broadcast channel, and/or the like. For example the determining module 1206 may receive information identifying a scrambling sequence that is to be used by the apparatus 1202 to scramble blocks of the physical broadcast channel, a scrambling sequence that is to be used by the apparatus 1202 to scramble repetitions of repeating subsets of bits of each block of the physical broadcast channel, a cell identity associated with the apparatus 1202 to initialize the scrambling sequences, and/or the like. In some aspects, the determining module 1206 may determine to apply tuples (e.g., quadruplets) of bits when scrambling repetitions of repeating subsets of bits. For example, during a second processing stage, the determining module 1206 may utilize a scrambling sequence that includes quadruplets of the same bit to scramble consecutive bits of the repetitions of repeating subsets of bits. This may have an effect equivalent to performing a phase rotation of symbols of the physical broadcast channel, thereby permitting user equipment 1250 to perform symbol level combining to recover the physical broadcast channel. In some aspects, the determining module 1206 may determine to apply another differentiator to the physical broadcast channel, such as by using an offset sequence to offset a mapping of QPSK symbols to resource elements of subframes of the physical broadcast channel to compensate for inter-cell interference.

In some aspects, the determining module 1206 may receive, from the reception module 1204 and as data 1212, information associated with determining a set of phase rotations to apply to a set of symbols. For example the determining module 1206 may receive information identifying a scrambling sequence that is to be used by the apparatus 1202, a cell identity associated with the apparatus 1202, a repetition index associated with a repetition of a set of bits, and/or the like, and may determine a set of phase rotations that are to be applied to resource elements of an OFDM symbol. In some aspects, the determining module 1206 may determine to apply a different phase rotation to each resource element of an OFDM symbol. For example, the determining module 1206 may determine to apply a plurality of phase rotations to an OFDM symbol. In some aspects, the determining module 1206 may determine to apply a different phase rotation to each OFDM symbol. For example, the determining module 1206 may apply the same phase rotation to each resource element of an OFDM symbol, and may apply a plurality of phase rotations to a corresponding plurality of OFDM symbols of a subframe. In some aspects, the determining module 1206 may determine to apply a different phase rotation to each subframe. For example, the determining module 1206 may apply the same phase rotation to each resource element of each OFDM symbol of a subframe, and may apply a plurality of phase rotations to a corresponding plurality of subframes of a physical broadcast channel (e.g., an NB-PBCH).

In some aspects, the transmission module 1208 may receive, from the determining module 1206 and as data 1214, information associated with transmitting a physical broadcast channel (e.g., an NB-PBCH), a physical shared channel (e.g., a narrowband physical downlink shared channel (NB-PDSCH or NPDSCH)), and/or the like to the user equipment 1250. In some aspects, the transmission module 1208 may receive information associated with transmitting a cell identifier identifying a cell identity. The transmission module 1208 may transmit, to the user equipment 1250 and as data 1216, a cell identifier and a physical broadcast channel. For example, the transmission module 1208 may transmit, as data 1216 and to the user equipment 1250, a plurality of blocks of the physical broadcast channel. In some aspects, during a first processing stage, the transmission module 1208 may scramble each block, of the plurality of blocks, with a respective scrambling sequence of a plurality of scrambling sequences. In some aspects, during a second processing stage, the transmission module 1208 may scramble each repetition of repeating subsets of bits of each block using a scrambling sequence of a set of scrambling sequences, such that a particular repetition of a repeating subset of bits of a first block and a corresponding particular repetition of a repeating subset of bits of a second block are scrambled using the same scrambling sequence. In some aspects, transmission module 1208 may scramble bits of the physical broadcast channel based at least in part on a cell identifier of a cell of the apparatus 1202 and may transmit the physical broadcast channel based at least in part on scrambling the bits of the physical broadcast channel.

In some aspects, the transmission module 1208 may receive, from the determining module 1206 and as data 1214, information associated with transmitting a physical broadcast channel (e.g., an NB-PBCH) to the user equipment 1250. In some aspects, the transmission module 1208 may receive information associated with applying a set of phase rotations to a set of symbols. In some aspects, the transmission module 1208 may receive information associated with transmitting a cell identifier identifying a cell identity. The transmission module 1208 may transmit, to the user equipment 1250 and as data 1216, a cell identifier and a physical broadcast channel. For example, the transmission module 1208 may transmit, as data 1216 and to the user equipment 1250, a plurality of sets of symbols of the physical broadcast channel. In some aspects, the transmission module 1208 may scramble each set of symbols, of the plurality of sets of symbols, with a respective scrambling sequence of a plurality of scrambling sequences. In some aspects, each set of symbols may be associated with at least one phase rotation. For example, transmission module 1208 may phase rotate a symbol based at least in part on a cell identifier of a cell of the apparatus 1202 and may transmit the symbol based at least in part on phase rotating the symbol.

The apparatus may include additional modules that perform each of the blocks of the algorithm in the aforementioned flow charts of FIG. 8, FIG. 9, FIG. 10, and/or FIG. 11. As such, each block in the aforementioned flow charts of FIG. 8, FIG. 9, FIG. 10, and/or FIG. 11 may be performed by a module and the apparatus may include one or more of those modules. The modules may be one or more hardware components specifically configured to carry out the stated processes/algorithms, implemented by a processor configured to perform the stated processes/algorithms, stored within a computer-readable medium for implementation by a processor, or some combination thereof.

The number and arrangement of modules shown in FIG. 12 are provided as an example. In practice, there may be additional modules, fewer modules, different modules, or differently arranged modules than those shown in FIG. 12. Furthermore, two or more modules shown in FIG. 12 may be implemented within a single module, or a single module shown in FIG. 12 may be implemented as multiple, distributed modules. Additionally, or alternatively, a set of modules (e.g., one or more modules) shown in FIG. 12 may perform one or more functions described as being performed by another set of modules shown in FIG. 12.

Figure 13:
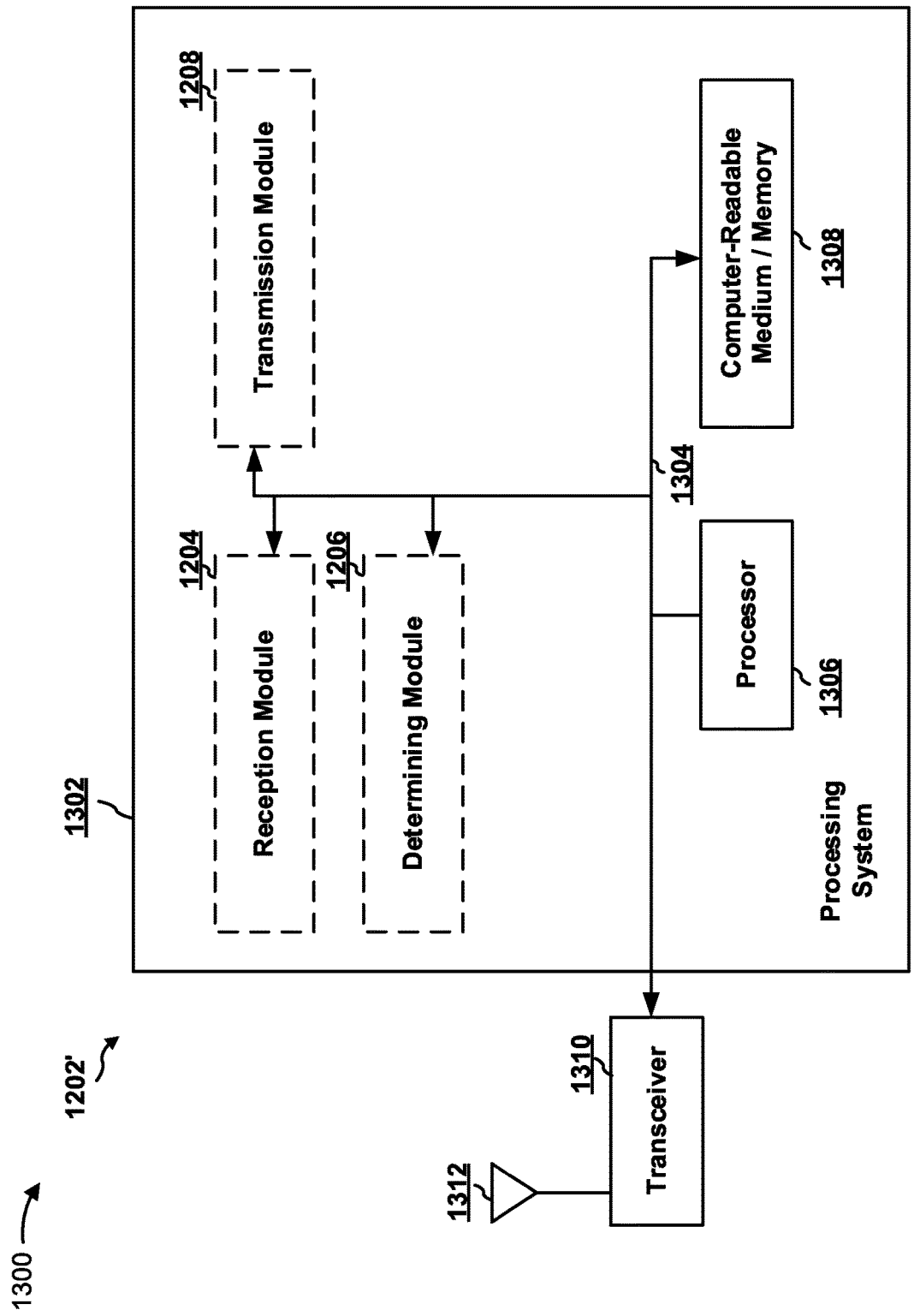
FIG. 13 is a diagram illustrating an example of a hardware implementation for an apparatus employing a processing system.

FIG. 13 is a diagram 1300 illustrating an example of a hardware implementation for an apparatus 1202' employing a processing system 1302. The apparatus 1202' may be a BS.

The processing system 1302 may be implemented with a bus architecture, represented generally by the bus 1304. The bus 1304 may include any number of interconnecting buses and bridges depending on the specific application of the processing system 1302 and the overall design constraints. The bus 1304 links together various circuits including one or more processors and/or hardware modules, represented by the processor 1306, the modules 1204, 1206, 1208, and the computer-readable medium/memory 1308. The bus 1304 may also link various other circuits such as timing sources, peripherals, voltage regulators, and power management circuits, which are well known in the art, and therefore, will not be described any further.

The processing system 1302 may be coupled to a transceiver 1310. The transceiver 1310 is coupled to one or more antennas 1312. The transceiver 1310 provides a means for communicating with various other apparatus over a transmission medium. The transceiver 1310 receives a signal from the one or more antennas 1312, extracts information from the received signal, and provides the extracted information to the processing system 1302, specifically the reception module 1204. In addition, the transceiver 1310 receives information from the processing system 1302, specifically the transmission module 1208, and based at least in part on the received information, generates a signal to be applied to the one or more antennas 1312. The processing system 1302 includes a processor 1306 coupled to a computer-readable medium/memory 1308. The processor 1306 is responsible for general processing, including the execution of software stored on the computer-readable medium/memory 1308. The software, when executed by the processor 1306, causes the processing system 1302 to perform the various functions described supra for any particular apparatus. The computer-readable medium/memory 1308 may also be used for storing data that is manipulated by the processor 1306 when executing software. The processing system further includes at least one of the modules 1204, 1206, and 1208. The modules may be software modules running in the processor 1306, resident/stored in the computer readable medium/memory 1308, one or more hardware modules coupled to the processor 1306, or some combination thereof. The processing system 1302 may be a component of the BS 110 and may include the memory 242 and/or at least one of the transmit processor 220, the receive processor 238, and/or the controller/processor 240.

In some aspects, the apparatus 1202/1202' for wireless communication includes means for transmitting a cell identifier for a cell. In some aspects, the apparatus 1202/1202' for wireless communication includes means for transmitting a physical broadcast channel. The physical broadcast channel may include a plurality of blocks. Each block, of the plurality of blocks, may include repeating subsets of bits. Each block, of the plurality of blocks, may be processed using a first processing stage. Each repetition of the repeating subsets of bits, for each block, may be processed using a second processing stage such that a particular repetition of the repeating subset of bits of a first block and a corresponding particular repetition of the repeating subset of bits of a second block are processed using a common processing scheme. The first processing stage and the second processing stage may be each initialized based at least in part on the cell identifier.

In some aspects, the apparatus 1202/1202' for wireless communication includes means for transmitting a cell identifier for a cell. In some aspects, the apparatus 1202/1202' for wireless communication includes means for transmitting a physical broadcast channel. The physical broadcast channel may include a plurality of sets of symbols. Each set of symbols, of the plurality of sets of symbols, may be scrambled with a respective scrambling sequence of a plurality of scrambling sequences. Each set of symbols, of the plurality of sets of symbols, may be associated with at least one phase rotation. The at least one phase rotation may be based at least in part on the cell identifier for the cell.

In some aspects, the apparatus 1202/1202' for wireless communication includes means for transmitting a channel, wherein each block, of a plurality of blocks of the channel, includes repetitions of sets of symbols, wherein each block, of the plurality of blocks, is scrambled using a scrambling sequence, of a plurality of scrambling sequences, initialized based at least in part on a block index of the block and a cell identifier for a cell, and wherein each repetition, of the repetitions of sets of symbols, for each block, is rotated using a different rotation sequence, of a plurality of rotation sequences, initialized based at least in part on a repetition index of the repetition.

In some aspects, the apparatus 1202/1202' for wireless communication includes means for transmitting a channel, wherein the channel includes a plurality of repetitions of a set of bits in a plurality of subframes, and wherein each repetition, of the plurality of repetitions, is scrambled using a different scrambling sequence, of a plurality of different scrambling sequences, initialized based at least in part on a non-linear combination of a cell identifier for a cell and a repetition index.

The aforementioned means may be one or more of the aforementioned modules of the apparatus 1202 and/or the processing system 1302 of the apparatus 1202' configured to perform the functions recited by the aforementioned means. As described supra, the processing system 1302 may include the transmit processor 220, the receive processor 238, and/or the controller/processor 240. As such, in one configuration, the aforementioned means may be the transmit processor 220, the receive processor 238, and/or the controller/processor 240 configured to perform the functions recited by the aforementioned means.

FIG. 13 is provided as an example. Other examples are possible and may differ from what was described in connection with FIG. 13.

FIG. 14 is a flow chart of a method 1400 of wireless communication. The method 1400 may be performed by a UE (e.g., which may correspond to one or more of the UE 120, such as UEs 120-1 and/or 120-2, UE 1250, the apparatus 1802/1802', and/or the like).

At 1410, the UE receives a cell identifier for a cell (block 1410). For example, the UE may receive the cell identifier from a BS before receiving a physical broadcast channel, such as an NB-PBCH. In some aspects, the UE may receive a PSS or an SSS, as described in more detail herein, which may include a cell identifier identifying, for example, a cell identity (cell ID or CID). Additionally, or alternatively, the UE may receive the cell identifier concurrent with receiving the physical broadcast channel.

At 1420, the UE receives a physical broadcast channel (block 1420). For example, the UE may receive the physical broadcast channel, which may include a plurality of blocks, from the BS. In some aspects, each block, of the plurality of blocks, includes repeating subsets of bits. In some aspects, each block, of the plurality of blocks, is processed using a first processing stage. In some aspects, each repetition of the repeating subsets of bits, for each block, is processed using a second processing stage such that a particular repetition of the repeating subset of bits of a first block and a corresponding particular repetition of the repeating subset of bits of a second block are processed using a common processing scheme. In some aspects, the first processing stage and the second processing stage are each initialized based at least in part on the cell identifier.

In some aspects, bits of the physical broadcast channel are recovered based at least in part on log-likelihood ratios (LLRs) for each block. In some aspects, processing of the second processing stage is reversed based at least in part on information identifying block boundaries associated with the plurality of blocks. In some aspects, processing of the first processing stage is reversed based at least in part on a determined scrambling sequence for the plurality of blocks.

In some aspects, the first block and the second block are scrambled using different scrambling sequences during the first processing stage. In some aspects, the different scrambling sequences during the first processing stage are based at least in part on a system frame number.

In some aspects, each repetition of the repeating subset of bits of the first block is scrambled using a respective one of a plurality of scrambling sequences during the second processing stage, each repetition of the repeating subset of bits of the second block is scrambled using a respective one of the plurality of scrambling sequences during the second processing stage, and the particular repetition of the repeating subset of bits of the first block and the corresponding particular repetition of the repeating subset of bits of the second block are scrambled using a same scrambling sequence, of the plurality of scrambling sequences, during the second processing stage. In some aspects, the plurality of scrambling sequences provide inter-cell interference randomization.

In some aspects, each scrambling sequence, of the plurality of scrambling sequences, comprises a group of bits having a common value. In some aspects, the repeating subsets of bits are modulated into symbols and symbols are phase rotated during the second processing stage.

In some aspects, first bits, of the particular repetition of the repeating subset of bits, are phase rotated using a first phase rotation, second bits, of the particular repetition of the repeating subset of bits, are phase rotated using a second phase rotation, and the second phase rotation is different from the first phase rotation. In this case, the first bits and the second bits may be scrambled using a scrambling sequence such that the first phase rotation and the second phase rotation are effectively caused, respectively, by the scrambling. In some aspects, the repeating subsets of bits are offset based at least in part on an offset sequence during the second processing stage.

At 1430, in some aspects, the UE reverses a set of processing stages applied to bits of the physical broadcast channel (block 1430). For example, the UE may reverse a first processing stage, such as a first set of scrambling sequences, applied to blocks of bits of the physical broadcast channel. Additionally, or alternatively, the UE may reverse a second processing stage, such as a second set of scrambling sequences, applied to repetitions of repeating subsets of bits of the physical broadcast channel. In some aspects, the UE may de-rotate a phase rotation applied to bits of the physical broadcast channel, such as a phase rotation applied based at least in part on using quadruplets of bits for a scrambling sequence. In some aspects, the UE may compensate for an offset applied to a mapping of resource elements of the physical broadcast channel. In some aspects, the UE may reverse the set of processing stages applied to each bit after receiving the physical broadcast channel. In some aspects, the UE may reverse one or more processing stages applied to first bits of the physical broadcast channel after receiving the first bits, and may subsequently receive second bits and reverse the one or more processing stages applied to second bits of the physical broadcast channel.

In some aspects, the physical broadcast channel includes a plurality of blocks, each block, of the plurality of blocks, includes repeating subsets of symbols, each repetition of the repeating subsets of symbols, for each block, is processed using a processing stage such that a particular repetition of the repeating subsets of symbols of a first block and a corresponding particular repetition of the repeating subsets of symbols of a second block are processed using a common processing scheme, and the processing stage is initialized based at least in part on the cell identifier and a repetition index.

In some aspects, a binary sequence is generated for each repetition index during the processing stage, scrambling sequences or rotation sequences are generated based at least in part on the binary sequences during the processing stage, and repetitions of the repeating subsets of symbols are scrambled based at least in part on the scrambling sequences or rotated based at least in part on the rotation sequences during the processing stage. In some aspects, the binary sequence is obtained based at least in part on a pseudo-random binary generator, and the pseudo-random binary generator is initialized based at least in part on the cell identifier and the repetition index. In some aspects, the pseudo-random binary generator is initialized based at least in part on a binary vector associated with a non-linear combination of the cell identifier and the repetition index. In some aspects, the repetition index is based at least in part on a radio frame number.

Although FIG. 14 shows example blocks of a method of wireless communication, in some aspects, the method may include additional blocks, fewer blocks, different blocks, or differently arranged blocks than those shown in FIG. 14. Additionally, or alternatively, two or more blocks shown in FIG. 14 may be performed in parallel.

FIG. 15 is a flow chart of a method 1500 of wireless communication. The method 1500 may be performed by a UE (e.g., which may correspond to one or more of the UE 120, such as UEs 120-1 and/or 120-2, UE 1250, the apparatus 1802/1802', and/or the like).

At 1510, the UE receives a cell identifier for a cell (block 1510). For example, the UE may receive the cell identifier from a BS before receiving a physical broadcast channel, such as an NB-PBCH. In some aspects, the UE may receive a PSS or an SSS, as described in more detail herein, which may include a cell identifier identifying, for example, a cell identity (cell ID or CID). Additionally, or alternatively, the UE may receive the cell identifier concurrent with receiving the physical broadcast channel.

At 1520, the UE receives a physical broadcast channel (block 1520). For example, the UE may receive the physical broadcast channel, which may include a plurality of sets of symbols, from the BS. In some aspects, each set of symbols, of the plurality of sets of symbols, is scrambled with a respective scrambling sequence of a plurality of scrambling sequences. In some aspects, each set of symbols, of the plurality of sets of symbols, is associated with at least one phase rotation. In some aspects, the at least one phase rotation is based at least in part on the cell identifier for the cell.

In some aspects, a symbol, of the plurality of sets of symbols, is de-rotated based at least in part on the cell identifier for the cell. In some aspects, each symbol, of a set of symbols of the plurality of sets of symbols, is associated with a same scrambling sequence of the plurality of scrambling sequences. In some aspects, the plurality of sets of symbols are modulated IQ symbols. In some aspects, the plurality of sets of symbols are quadrature phase-shift keying (QPSK) symbols.

In some aspects, each cell, of a set of cells that includes the cell, is associated with a different set of phase rotations. In some aspects, the at least one phase rotation is a plurality of phase rotations. In some aspects, the at least one phase rotation is one phase rotation. In some aspects, the at least one phase rotation is determined based at least in part on a scrambling sequence of the plurality of scrambling sequences. In some aspects, the at least one phase rotation is determined based at least in part on a set of orthogonal or quasi-orthogonal sequences.

Although FIG. 15 shows example blocks of a method of wireless communication, in some aspects, the method may include additional blocks, fewer blocks, different blocks, or differently arranged blocks than those shown in FIG. 15. Additionally, or alternatively, two or more blocks shown in FIG. 15 may be performed in parallel.

FIG. 16 is a flow chart of a method 1600 of wireless communication. The method 1600 may be performed by a UE (e.g., which may correspond to one or more of the UE 120, such as UEs 120-1 and/or 120-2, UE 1250, the apparatus 1802/1802', and/or the like).

At 1610, the UE receives a channel (block 1610). For example, the UE may receive a narrowband physical broadcast channel from a base station associated with a cell. In some aspects, the UE may receive a plurality of blocks of the narrowband physical broadcast channel, and each block may include repetitions of sets of bits.

In some aspects, a plurality of phase rotations are applied to the repetitions of sets of symbols based at least in part on the equation:

$$\theta_f(i) = \begin{cases} 1, & \text{if } c_f(2i) = 0 \text{ and } c_f(2i+1) = 0 \\ -1, & \text{if } c_f(2i) = 0 \text{ and } c_f(2i+1) = 1 \\ j, & \text{if } c_f(2i) = 1 \text{ and } c_f(2i+1) = 0 \\ -j, & \text{if } c_f(2i) = 1 \text{ and } c_f(2i+1) = 1 \end{cases}.$$

In some aspects, the plurality of scrambling sequences are initialized based at least in part on the equation:

$$c_{init} = +(N_{ID}^{Ncell}+1)(n_f \bmod 8+1)^3 \cdot 2^9 + N_{ID}^{Ncell}.$$

In some aspects, the channel is a physical broadcast channel. In some aspects, the repetition index is based at least in part on a radio frame number. In some aspects, a binary sequence, of a plurality of binary sequences, is generated for each repetition index associated with the repetitions of sets of symbols, and wherein the plurality of rotation sequences are generated based at least in part on the plurality of binary sequences. In some aspects, the plurality of binary sequences are obtained based at least in part on a pseudo-random binary generator, and the pseudo-random binary generator is initialized, for each binary sequence, of the plurality of binary sequences, based at least in part on a corresponding cell identifier and a corresponding repetition index.

At 1620, in some aspects, the UE de-scrambles and/or de-rotates the channel (block 1620). For example, the UE may de-scramble and/or de-rotate bits of the channel based at least in part on a plurality of scrambling sequences and/or a plurality of rotation sequences. In some aspects, each block, of a plurality of blocks of the channel, includes repetitions of sets of symbols. In some aspects, each block, of the plurality of blocks, is scrambled using a scrambling sequence, of a plurality of scrambling sequences, initialized based at least in part on a block index of the block and the cell identifier for the cell. In some aspects, each repetition, of the repetitions of sets of symbols, for each block is rotated using a different rotation sequence, of a plurality of rotation sequences, initialized based at least in part on a repetition index of the repetition.

At 1630, in some aspects, the UE recovers bits of the channel based at least in part on de-scrambling and/or de-rotating the channel (block 1630). For example, the UE may recover data from the channel based at least in part on de-scrambling and/or de-rotating the channel to recover a communication from the base station.

Although FIG. 16 shows example blocks of a method of wireless communication, in some aspects, the method may include additional blocks, fewer blocks, different blocks, or differently arranged blocks than those shown in FIG. 16. Additionally, or alternatively, two or more blocks shown in FIG. 16 may be performed in parallel.

FIG. 17 is a flow chart of a method 1700 of wireless communication. The method 1700 may be performed by a UE (e.g., which may correspond to one or more of the UE 120, such as UEs 120-1 and/or 120-2, UE 1250, the apparatus 1802/1802', and/or the like).

At 1710, the UE receives a channel (block 1710). For example, the UE may receive a channel that includes a plurality of repetitions of a set of bits in a plurality of subframes. In some aspects, each repetition, of the plurality of repetitions, is scrambled using a different scrambling sequence, of a plurality of different scrambling sequences, initialized based at least in part on a non-linear combination of the cell identifier and a repetition index.

At 1720, in some aspects, the UE de-scrambles the channel (block 1720). For example, the UE may determine a scrambling sequence applied to a set of bits of the channel, and may reverse the scrambling sequence to de-scramble the channel. In some aspects, each scrambling sequence, of the plurality of different scrambling sequences, includes a plurality of tuples of bits, and each repetition is scrambled based at least in part on a tuple of bits, of the plurality of tuples of bits, associated with a corresponding scrambling sequence, of the plurality of different scrambling sequences. In some aspects, the channel conveys a SIB 1.

In some aspects, each binary sequence, of a plurality of binary sequences, is obtained based at least in part on a binary generator, the binary generator is initialized based at least in part on the cell identifier and the repetition index, and the plurality of scrambling sequences are obtained based at least in part on a corresponding binary sequence of the plurality of binary sequences. In some aspects, the binary generator is initialized based at least in part on a binary vector associated with a non-linear combination of the cell identifier and the repetition index. In some aspects, the repetition index is based at least in part on a radio frame number.

At 1730, in some aspects, the UE recovers bits of the channel based at least in part on de-scrambling the channel (block 1730). For example, the UE may recover bits of the channel based at least in part on descrambling the channel to determine information conveyed by a base station to the UE.

Although FIG. 17 shows example blocks of a method of wireless communication, in some aspects, the method may include additional blocks, fewer blocks, different blocks, or differently arranged blocks than those shown in FIG. 17. Additionally, or alternatively, two or more blocks shown in FIG. 17 may be performed in parallel.

Figure 18:
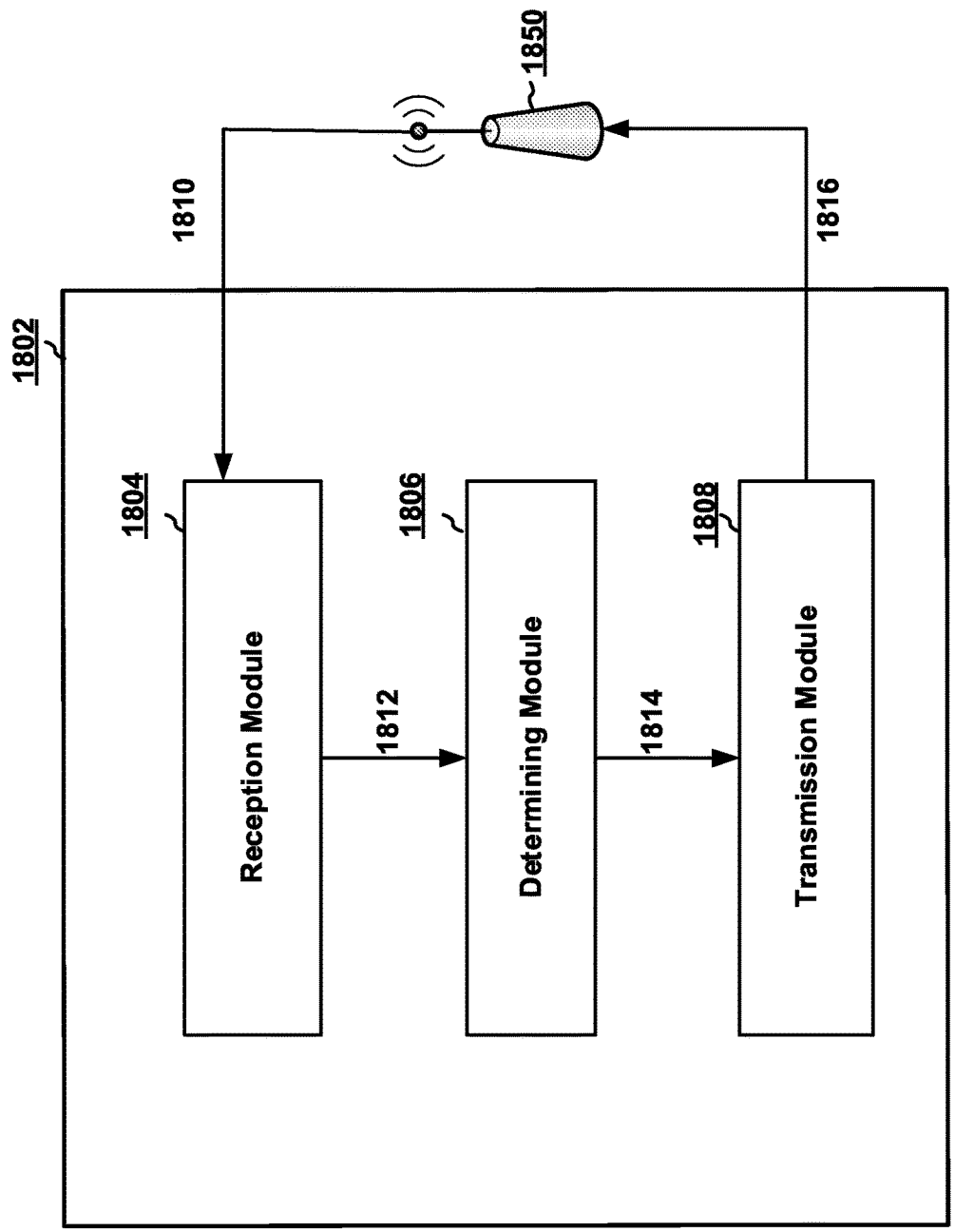
FIG. 18 is a conceptual data flow diagram illustrating the data flow between different modules/means/components in another example apparatus.

FIG. 18 is a conceptual data flow diagram 1800 illustrating the data flow between different modules/means/components in an example apparatus 1802. The apparatus 1802 may be a UE. In some aspects, the apparatus 1802 includes a reception module 1804, a determining module 1806, and/or a transmission module 1808.

The reception module 1804 may receive, from a base station 1850 and as data 1810, information associated with a physical broadcast channel (e.g., an NB-PBCH), a physical shared channel (e.g., an NB-PDSCH), and/or the like. For example, the reception module 1804 may receive a cell identifier identifying a cell identity, such as information included in a PSS or SSS transmission. Additionally, or alternatively, the reception module 1804 may receive a physical broadcast channel or a physical shared channel. In some aspects, the reception module 1804 may de-scramble scrambled bits of the physical broadcast channel, de-rotate phase-rotated symbols of the physical broadcast channel, and/or the like. In some aspects, the reception module 1804 may demodulate the bits of the physical broadcast channel. In some aspects, the reception module 1804 may perform an averaging procedure on a set of repetitions of a repeating subset of bits in blocks of the physical broadcast channel to recover information conveyed in the physical broadcast channel. In some aspects, the reception module 1804 may receive a physical broadcast channel including phase-rotated symbols. In some aspects, the reception module 1804 may de-rotate the phase-rotated symbols to determine information conveyed by the phase-rotated symbols.

In some aspects, the determining module 1806 may receive, from the reception module 1804 and as data 1812, information associated the physical broadcast channel (e.g., an NB-PBCH). For example, based at least in part on receiving a cell identifier identifying a cell identity, information identifying a block boundary associated with blocks of the physical broadcast channel, and/or the like, the determining module 1806 may determine a set of scrambling sequences that are applied to bits of the physical broadcast channel to enable the apparatus 1802 to de-scramble the bits of the physical broadcast channel. In some aspects, the determining module 1806 may determine a set of LLRs for the set of bits of the physical broadcast channel. For example, the determining module 1806 may determine a set of LLRs, and may combine the LLRs across blocks of the physical broadcast channel (e.g., based at least in part on the second processing stage repeating a set of scrambling sequences for each block of the physical broadcast channel) to remove scrambling from bits of the physical broadcast channel.

In some aspects, the determining module 1806 may receive, from the reception module 1804 and as data 1812, information associated the physical broadcast channel (e.g., an NB-PBCH). For example, based at least in part on receiving a cell identifier identifying a cell identity, the determining module 1806 may determine a set of phase rotations that are applied to symbols of the physical broadcast channel to enable the apparatus 1802 to de-rotate the phase-rotated symbols of the physical broadcast channel.

The transmission module 1808 may receive, from the determining module 1806 and as data 1814, information associated with the physical broadcast channel (e.g., an NB-PBCH). For example, based at least in part on de-scrambling bits of the physical broadcast channel to recover information conveyed via the physical broadcast channel, the determining module 1806 may determine information to transmit to the base station 1850, and may provide the information to transmission module 1808 for transmission to the base station 1850. In some aspects, the transmission module may transmit data 1816 to the base station 1850 to convey the information from the determining module 1806.

The apparatus may include additional modules that perform each of the blocks of the algorithm in the aforementioned flow charts of FIG. 14, FIG. 15, FIG. 16, and/or FIG. 17. As such, each block in the aforementioned flow charts of FIG. 14, FIG. 15, FIG. 16, and/or FIG. 17 may be performed by a module and the apparatus may include one or more of those modules. The modules may be one or more hardware components specifically configured to carry out the stated processes/algorithms, implemented by a processor configured to perform the stated processes/algorithms, stored within a computer-readable medium for implementation by a processor, or some combination thereof.

The number and arrangement of modules shown in FIG. 18 are provided as an example. In practice, there may be additional modules, fewer modules, different modules, or differently arranged modules than those shown in FIG. 18. Furthermore, two or more modules shown in FIG. 18 may be implemented within a single module, or a single module shown in FIG. 18 may be implemented as multiple, distributed modules. Additionally, or alternatively, a set of modules (e.g., one or more modules) shown in FIG. 18 may perform one or more functions described as being performed by another set of modules shown in FIG. 18.

Figure 19:
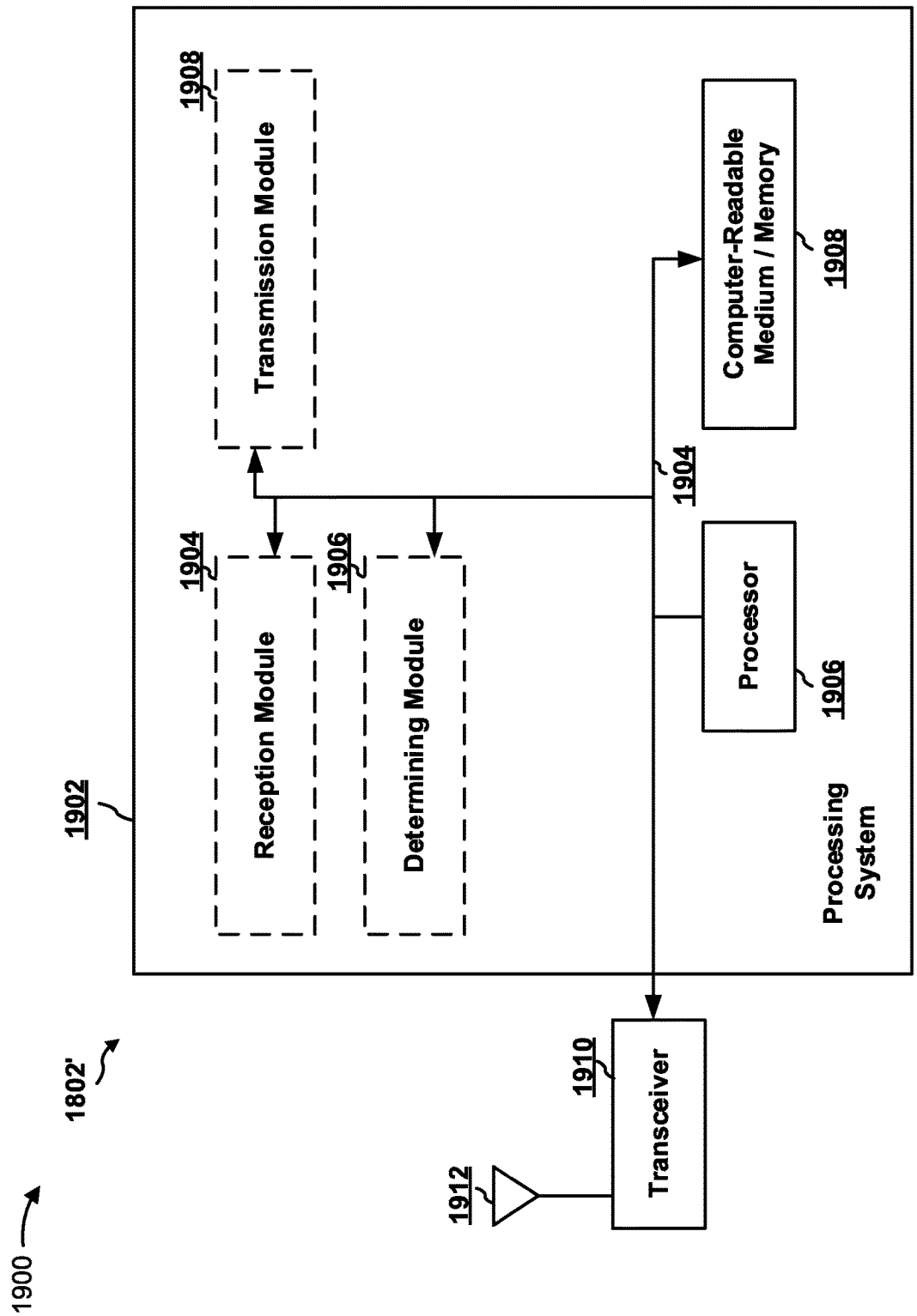
FIG. 19 is a diagram illustrating an example of a hardware implementation for the other apparatus employing a processing system.

FIG. 19 is a diagram 1900 illustrating an example of a hardware implementation for an apparatus 1802' employing a processing system 1902. The apparatus 1802' may be a UE.

The processing system 1902 may be implemented with a bus architecture, represented generally by the bus 1904. The bus 1904 may include any number of interconnecting buses and bridges depending on the specific application of the processing system 1902 and the overall design constraints. The bus 1904 links together various circuits including one or more processors and/or hardware modules, represented by the processor 1906, the modules 1804, 1806, 1808, and the computer-readable medium/memory 1908. The bus 1904 may also link various other circuits such as timing sources, peripherals, voltage regulators, and power management circuits, which are well known in the art, and therefore, will not be described any further.

The processing system 1902 may be coupled to a transceiver 1910. The transceiver 1910 is coupled to one or more antennas 1912. The transceiver 1910 provides a means for communicating with various other apparatus over a transmission medium. The transceiver 1910 receives a signal from the one or more antennas 1912, extracts information from the received signal, and provides the extracted information to the processing system 1902, specifically the reception module 1804. In addition, the transceiver 1910 receives information from the processing system 1902, specifically the transmission module 1808, and based at least in part on the received information, generates a signal to be applied to the one or more antennas 1912. The processing system 1902 includes a processor 1906 coupled to a computer-readable medium/memory 1908. The processor 1906 is responsible for general processing, including the execution of software stored on the computer-readable medium/memory 1908. The software, when executed by the processor 1906, causes the processing system 1902 to perform the various functions described supra for any particular apparatus. The computer-readable medium/memory 1908 may also be used for storing data that is manipulated by the processor 1906 when executing software. The processing system further includes at least one of the modules 1804, 1806, and 1808. The modules may be software modules running in the processor 1906, resident/stored in the computer readable medium/memory 1908, one or more hardware modules coupled to the processor 1906, or some combination thereof. The processing system 1902 may be a component of the UE 120 and may include the memory 282 and/or at least one of the receive processor 258, the transmit processor 264, and/or the controller/processor 280.

In some aspects, the apparatus 1802/1802' for wireless communication includes means for receiving a cell identifier for a cell. In some aspects, the apparatus 1802/1802' for wireless communication includes means for receiving a physical broadcast channel. The physical broadcast channel may include a plurality of blocks. Each block, of the plurality of blocks, may include repeating subsets of bits. Each block, of the plurality of blocks, may be processed using a first processing stage. Each repetition of the repeating subsets of bits, for each block, may be processed using a second processing stage such that a particular repetition of the repeating subset of bits of a first block and a corresponding particular repetition of the repeating subset of bits of a second block are processed using a common processing scheme. The first processing stage and the second processing stage may be each initialized based at least in part on the cell identifier.

In some aspects, the apparatus 1802/1802' for wireless communication includes means for receiving a cell identifier for a cell. In some aspects, the apparatus 1802/1802' for wireless communication includes means for receiving a physical broadcast channel. The physical broadcast channel may include a plurality of sets of symbols. Each set of symbols, of the plurality of sets of symbols, may be scrambled with a respective scrambling sequence of a plurality of scrambling sequences. Each set of symbols, of the plurality of sets of symbols, may be associated with at least one phase rotation. The at least one phase rotation may be based at least in part on the cell identifier for the cell.

In some aspects, the apparatus 1802/1802' for wireless communication includes means for receiving, from a base station associated with a cell identifier for a cell, a channel, wherein each block, of a plurality of blocks of the channel, includes repetitions of sets of symbols, wherein each block, of the plurality of blocks, is scrambled using a scrambling sequence, of a plurality of scrambling sequences, initialized based at least in part on a block index of the block and the cell identifier for the cell, wherein each repetition, of the repetitions of sets of symbols, for each block is rotated using a different rotation sequence, of a plurality of rotation sequences, initialized based at least in part on a repetition index of the repetition.

In some aspects, the apparatus 1802/1802' for wireless communication includes means for receiving, from a base station associated with a cell identifier for a cell, a channel, wherein the channel includes a plurality of repetitions of a set of bits in a plurality of subframes, and wherein each repetition, of the plurality of repetitions, is scrambled using a different scrambling sequence, of a plurality of different scrambling sequences, initialized based at least in part on a non-linear combination of the cell identifier and a repetition index.

The aforementioned means may be one or more of the aforementioned modules of the apparatus 1802 and/or the processing system 1902 of the apparatus 1802' configured to perform the functions recited by the aforementioned means. As described supra, the processing system 1902 may the receive processor 258, the transmit processor 264, and/or the controller/processor 280. As such, in one configuration, the aforementioned means may be the receive processor 258, the transmit processor 264, and/or the controller/processor 280 configured to perform the functions recited by the aforementioned means.

FIG. 19 is provided as an example. Other examples are possible and may differ from what was described in connection with FIG. 19.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication, comprising:
applying, by a base station associated with a cell identifier for a cell, a first processing stage to a plurality of blocks of a channel,
wherein each block, of the plurality of blocks, includes repetitions of sets of symbols, and
wherein, when applying the first processing stage, each block, of the plurality of blocks, is scrambled using a scrambling sequence, of a plurality of scrambling sequences, initialized based on a block index of the block and the cell identifier;
applying, by the base station, a second processing stage to the repetitions of sets of symbols,
wherein, when applying the second processing stage, each repetition, of the repetitions of sets of symbols, for each block, is rotated using a different rotation sequence, of a plurality of rotation sequences, initialized based on a non-linear combination of the cell identifier and a repetition index of the repetition;
transmitting, by the base station, a primary synchronization signal (PSS) or a secondary synchronization signal (SSS) that indicates the cell identifier; and
transmitting, by the base station, the channel after applying the first processing stage and the second processing stage to one or more bits of the channel.

2. The method of claim 1, wherein a plurality of phase rotations are applied to the repetitions of sets of symbols based on the equation:

$$\theta_f(i) = \begin{cases} 1, & \text{if } c_f(2i) = 0 \text{ and } c_f(2i+1) = 0 \\ -1, & \text{if } c_f(2i) = 0 \text{ and } c_f(2i+1) = 1 \\ j, & \text{if } c_f(2i) = 1 \text{ and } c_f(2i+1) = 0 \\ -j, & \text{if } c_f(2i) = 1 \text{ and } c_f(2i+1) = 1 \end{cases}.$$

3. The method of claim 1, wherein the plurality of scrambling sequences are initialized based on the equation:

$$c_{init} = (N_{ID}^{Ncell}+1)(n_f \bmod 8+1)^3 \cdot 2^9 + N_{ID}^{Ncell}.$$

4. The method of claim 1, wherein the channel is a physical broadcast channel.

5. The method of claim 1, wherein the repetition index is based on a radio frame number.

6. The method of claim 1, wherein a binary sequence, of a plurality of binary sequences, is generated for each repetition index associated with the repetitions of sets of symbols; and
wherein the plurality of rotation sequences are generated based on the plurality of binary sequences.

7. The method of claim 6, wherein the plurality of binary sequences are obtained based on a binary generator; and
wherein the binary generator is initialized, for each binary sequence, of the plurality of binary sequences, based on a corresponding cell identifier and a corresponding repetition index.

8. The method of claim 6, wherein the plurality of binary sequences are obtained based on a binary generator; and
wherein the binary generator is initialized, for each binary sequence, of the plurality of binary sequences, based on a binary vector associated with the non-linear combination of the cell identifier and the repetition index.

9. A method for wireless communication, comprising:
receiving, by a user equipment and from a base station associated with a cell identifier for a cell, a primary synchronization signal (PSS) or a secondary synchronization signal (SSS) that indicates the cell identifier;
receiving, by the UE and from the base station, a channel after receiving the PSS or the SSS from the base station,
wherein each block, of a plurality of blocks of the channel, includes repetitions of sets of symbols,
wherein each block, of the plurality of blocks, is scrambled using a scrambling sequence, of a plurality of scrambling sequences, initialized based on a block index of the block and the cell identifier for the cell, and
wherein each repetition, of the repetitions of sets of symbols, for each block is rotated using a different rotation sequence, of a plurality of rotation sequences, initialized based on a non-linear combination of the cell identifier for the cell and a repetition index of the repetition;
reversing, by the UE, a first processing stage applied to the plurality of blocks; and reversing, by the UE, a second processing stage applied to the repetitions of sets of symbols.

10. The method of claim 9, wherein a plurality of phase rotations are applied to the repetitions of sets of symbols based on the equation:

$$\theta_f(i) = \begin{cases} 1, & \text{if } c_f(2i) = 0 \text{ and } c_f(2i+1) = 0 \\ -1, & \text{if } c_f(2i) = 0 \text{ and } c_f(2i+1) = 1 \\ j, & \text{if } c_f(2i) = 1 \text{ and } c_f(2i+1) = 0 \\ -j, & \text{if } c_f(2i) = 1 \text{ and } c_f(2i+1) = 1 \end{cases}.$$

11. The method of claim 9, wherein the plurality of scrambling sequences are initialized based on the equation:

$$c_{init} = (N_{ID}^{Ncell}+1)(n_f \bmod 8+1)^3 \cdot 2^9 + N_{ID}^{Ncell}.$$

12. The method of claim 9, wherein the channel is a physical broadcast channel.

13. The method of claim 9, wherein the repetition index is based on a radio frame number.

14. The method of claim 9, wherein a binary sequence, of a plurality of binary sequences, is generated for each repetition index associated with the repetitions of sets of symbols; and
wherein the plurality of rotation sequences are generated based on the plurality of binary sequences.

15. The method of claim 14, wherein the plurality of binary sequences are obtained based on a binary generator; and
wherein the binary generator is initialized, for each binary sequence, of the plurality of binary sequences.

16. A method for wireless communication, comprising:
applying, by a base station associated with a cell identifier for a cell, one or more processing stages to one or more bits of a channel,
wherein the channel includes a plurality of repetitions of a set of bits in a plurality of subframes, and
wherein, when applying the one or more processing stages, each repetition, of the plurality of repetitions, is scrambled using a different scrambling sequence, of a plurality of different scrambling sequences, initialized based on a non-linear combination of the cell identifier and a repetition index;
transmitting, by the base station, a primary synchronization signal (PSS) or a secondary synchronization signal (SSS) that indicates the cell identifier; and
transmitting, by the base station, the channel after applying the one or more processing stages to the one or more bits of the channel.

17. The method of claim 16, wherein each scrambling sequence, of the plurality of different scrambling sequences, includes a plurality of tuples of bits; and
wherein each repetition is scrambled based on a tuple of bits, of the plurality of tuples of bits, associated with a corresponding scrambling sequence, of the plurality of different scrambling sequences.

18. The method of claim 16, wherein the channel conveys a system information block type-1 (SIB1).

19. The method of claim 16, wherein each binary sequence, of a plurality of binary sequences, is obtained based on a binary generator;
wherein the binary generator is initialized based on the cell identifier and the repetition index; and
wherein the plurality of scrambling sequences are obtained based on a corresponding binary sequence of the plurality of binary sequences.

20. The method of claim 19, wherein the binary generator is initialized based on a binary vector associated with the non-linear combination of the cell identifier and the repetition index.

21. The method of claim 16, wherein the repetition index is based on a radio frame number.

22. The method of claim 16, wherein the plurality of scrambling sequences are determined based on a Gold code.

23. The method of claim 16, wherein the plurality of different scrambling sequences are based on an equation:

$$c_{init} = n_{RNTI} \cdot 2^{15} + (N_{ID}^{Ncell}+1)(n_f \bmod 61)+1), \text{ or}$$

$$c_{init} = n_{RNTI} \cdot 2^{14} + n_f \bmod 2 \cdot 2^{13} + \lfloor n_s/2 \rfloor \cdot 2^9 + N_{ID}^{Ncell}.$$

24. The method of claim 16, wherein the channel is a physical shared channel.

25. A method for wireless communication, comprising:
receiving, by a user equipment and from a base station associated with a cell identifier for a cell, a primary synchronization signal (PSS) or a secondary synchronization signal (SSS) that indicates the cell identifier;
receiving, by the UE and from the base station, a channel after receiving the PSS or the SSS from the base station,
wherein the channel includes a plurality of repetitions of a set of bits in a plurality of subframes, and
wherein each repetition, of the plurality of repetitions, is scrambled using a different scrambling sequence, of a plurality of different scrambling sequences, initialized based on a non-linear combination of the cell identifier and a repetition index, and
wherein the repetition index is based on a radio frame number; and
reversing, by the user equipment, one or more processing stages applied to one or more bits of the channel.

26. The method of claim 25, wherein each scrambling sequence, of the plurality of different scrambling sequences, includes a plurality of tuples of bits; and
wherein each repetition is scrambled based on a tuple of bits, of the plurality of tuples of bits, associated with a corresponding scrambling sequence, of the plurality of different scrambling sequences.

27. The method of claim 25, wherein the channel conveys a system information block type-1 (SIB1).

28. The method of claim 25, wherein each binary sequence, of a plurality of binary sequences, is obtained based on a binary generator;
wherein the binary generator is initialized based on the cell identifier and the repetition index; and
wherein the plurality of scrambling sequences are obtained based on a corresponding binary sequence of the plurality of binary sequences.

29. The method of claim 28, wherein the binary generator is initialized based on a binary vector associated with the non-linear combination of the cell identifier and the repetition index.

30. The method of claim 25, wherein the non-linear combination comprises at least one term that is a product based on the cell identifier and the repetition index.

* * * * *